United States Patent
Tembey et al.

(10) Patent No.: US 9,521,143 B2
(45) Date of Patent: Dec. 13, 2016

(54) CONTENT CONTROL AT GATEWAY BASED ON AUDIENCE

(71) Applicant: QUALCOMM Incorporated, San Diego, CA (US)

(72) Inventors: Priyanka Tembey, Mountain View, CA (US); Saumitra Mohan Das, Santa Clara, CA (US); Hui Chao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 14/627,620

(22) Filed: Feb. 20, 2015

(65) Prior Publication Data

US 2016/0248766 A1 Aug. 25, 2016

(51) Int. Cl.
*H04L 29/06* (2006.01)
*G06F 9/00* (2006.01)
*G06F 15/16* (2006.01)
*G06F 17/00* (2006.01)

(52) U.S. Cl.
CPC ....... *H04L 63/0861* (2013.01); *H04L 63/0281* (2013.01); *H04L 63/105* (2013.01)

(58) Field of Classification Search
None
See application file for complete search history.

(56) References Cited

U.S. PATENT DOCUMENTS

| | | | | |
|---|---|---|---|---|
| 6,968,565 B1* | 11/2005 | Slaney | .................. | H04H 60/45 348/156 |
| 8,523,667 B2* | 9/2013 | Clavin | ............... | G06K 9/00369 345/18 |
| 8,543,665 B2* | 9/2013 | Ansari | .................. | G06Q 30/04 709/218 |
| 8,718,633 B2* | 5/2014 | Sprigg | .................... | H04M 1/66 455/411 |
| 2009/0210902 A1* | 8/2009 | Slaney | .................. | H04H 60/45 725/34 |
| 2010/0004977 A1* | 1/2010 | Marci | .................... | G06Q 10/10 705/7.32 |
| 2011/0050656 A1* | 3/2011 | Sakata | .................... | G06F 3/011 345/204 |
| 2012/0092167 A1* | 4/2012 | Hohl | ...................... | G06F 3/017 340/573.1 |
| 2012/0167129 A1* | 6/2012 | Liou | .................. | H04N 21/4542 725/27 |

(Continued)

*Primary Examiner* — Shin-Hon Chen
(74) *Attorney, Agent, or Firm* — DeLizio Law, PLLC

(57) ABSTRACT

A gateway device may control access to content based, at least in part, on an audience that will consume the content. In relation to a request for content to be delivered to a media output device, the gateway device may obtain biometric data from one or more trait capture devices having a physical relation to the media output device. The gateway can determine the potential audience of the content and enforce content restrictions based on the audience. The content restrictions may be based on one or more content attributes about the content and one or more audience traits about the audience. The gateway may use thresholds associated with the audience trait to determine whether the content attribute is appropriate for the audience. The threshold or a combination of thresholds may provide for granular control of access to content.

24 Claims, 18 Drawing Sheets

(56) References Cited

U.S. PATENT DOCUMENTS

| | | | |
|---|---|---|---|
| 2012/0311673 A1* | 12/2012 | Sodah | G06F 21/6218 726/4 |
| 2013/0212615 A1* | 8/2013 | Schultz | H04L 12/2812 725/25 |
| 2014/0023338 A1* | 1/2014 | Won | H04N 21/4223 386/230 |
| 2016/0112760 A1* | 4/2016 | Kosseifi | H04N 21/4542 725/28 |

* cited by examiner

EXAMPLE MEDIA OUTPUT DEVICES AND TRAIT CAPTURE DEVICES

CONTENT CONTROL AT GATEWAY BASED ON AUDIENCE

TECHNICAL FIELD

Embodiments of the present subject matter generally relate to the field of dynamic information retrieval via a network, and, more particularly, to a gateway device for controlling access to content.

BACKGROUND

A gateway device typically interfaces a first network (such as a home, business, or other location) with a second network (such as a wide area network, or Internet). Gateway devices may also be referred to as residential gateways, routers, firewalls, or proxy servers. Gateway devices typically enable devices on a first network to access resources on a second network. For example, a gateway device may facilitate communication between a media output device (such as a television, computer, networked radio, or the like) and a content source. Media output devices may include traditional computing devices (such as desktops, laptops, tablets, smart phones, etc.) or other network-enabled devices (such as televisions, stereo equipment, displays on appliances, picture frames, wearable devices, etc.). The content source may provide the content to the media output device via the gateway device.

While some media output devices may implement safeguards to protect viewers from inappropriate content (such as a child safety setting on a computer or parental controls on a television), other media output devices may not. Furthermore, the existing safeguards may be difficult to implement and administer for a plurality of media output devices at one location. Typically, gateway devices provide security features such as basic firewalls and/or basic filtering rules.

SUMMARY

A gateway device may control access to content based on an audience of the media output device. The gateway device may obtain biometric data from one or more trait capture devices in proximity to the media output device. Using the biometric information, the gateway device can determine the audience, and enforce a content restriction based on the audience.

In one embodiment, a gateway device may detect a request for content to be delivered to a media output device via the gateway device. The gateway device may determine an audience trait associated with an audience of the media output device based, at least in part, on biometric data associated with at least one person in the audience. The gateway device may determine a content attribute associated with content. The gateway device may determine that the content attribute is not within a threshold associated with the audience trait. The gateway device may prevent sending the content to the media output device in response to determining the content attribute is not within the threshold.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
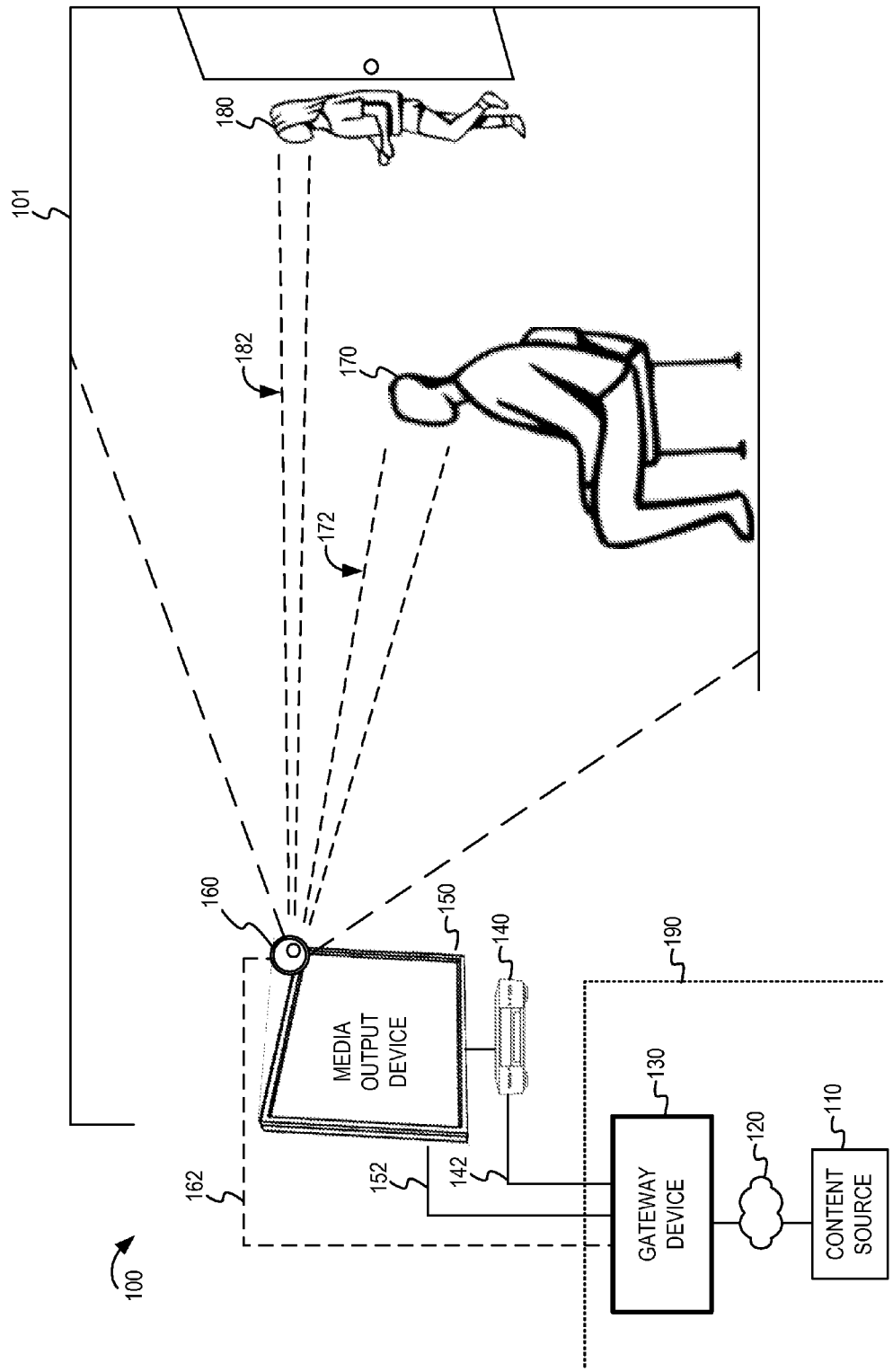
FIG. 1 depicts an example scenario of a gateway device controlling access to content based on audience, in accordance with an embodiment of this disclosure.

The disclosure relates to a gateway device that dynamically implements content restriction policies. The description that follows includes exemplary systems, methods, techniques, instruction sequences and computer program products that embody techniques of the present subject matter. However, it is understood that the described embodiments may be practiced without these specific details. For instance, although examples refer to parental control using age-based content ratings and age detection of an audience, embodiments are not so limited. The disclosed techniques not limited to parental controls in a home, and could be used to restrict access to content for other environments, such as workplaces, libraries, prisons, etc.

In accordance with this disclosure, a gateway device may determine whether to provide content from a content source to a media output device based on who is viewing the media output device. In one embodiment, a gateway device may implement parental controls to prevent inappropriate content from being provided to a television when children are viewing. The gateway device may dynamically restrict content based on one or more content attributes. Content attributes can include one or more (or a combination) of administrator preferences (e.g., parent setting), content ratings (e.g., movie rating), content description, language in closed captioning data or song lyrics (e.g., profanity), metadata (e.g., parent reviews of a movie), other classification data regarding the content, or the like. The content attribute(s) may be determined in advance (such as an age-based content rating), or during "real-time" access of the content. For example, the gateway device can buffer and examine a portion of the content prior to sending the content to the media output device.

In some embodiments, the gateway device determines whether to provide the content to the media output device based on the content attributes and information about an audience (i.e., viewers) of the media output device. An audience is one or more persons who, based on their physical location, are capable of encountering or perceiving the content from the media output device. Information about an audience may be referred to as an audience trait. An audience trait describes a trait of one or more persons in proximity to the media output device. For example, the gateway device may obtain information about an audience gathered around television. Using the information, the gateway device may determine who is in the audience. If the gateway device determines that children are in the audience of the television, the gateway device may prevent an adult rated movie from being provided to the television. In one example, an audience trait is a youngest viewer's age. Based on the youngest viewer's age, the gateway device determines whether to provide requested content to the television. Although age may be one audience trait, other audience traits include a viewer identity, a psychological trait, an emotional state, and/or a membership in a predefined class of persons (such as an employee of a company, or a prisoner of a ward).

Figure 3:
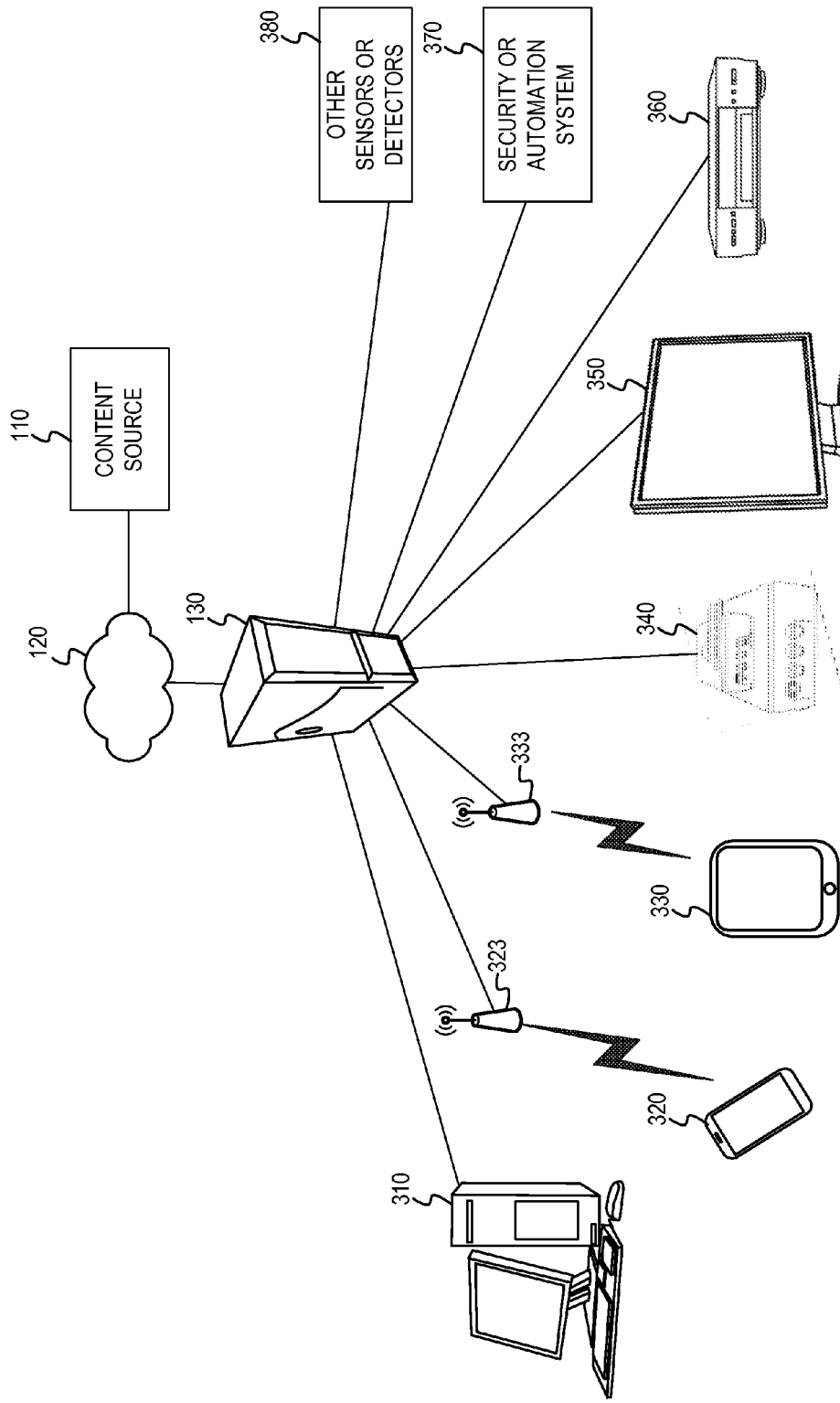
FIG. 3 depicts an example system including a gateway device, content source, and network, according to some embodiments of this disclosure.

The audience trait can be determined using biometric data obtained from one or more trait capture devices in proximity to the media output device. Trait capture devices can capture information associated with persons in proximity to a media output device. Trait capture devices can include cameras, microphones, sensors, detectors, etc. In addition, trait capture devices may be integrated with other machines. FIG. 3 provides several examples of trait capture devices. Biometric data refers to information related to human characteristics that can be used to identify, categorize, or describe one or more persons. Biometric data may include physiological characteristics (such as body shape, hair color, height, gender, mouth shape, eye color or shape, facial patterns, odor/scent, fingerprint, palm print, etc.) or behavioral characteristics (such as voice pattern, posture, gait). Other examples of biometric data may include psychological or emotional markers about a person.

Administrator preferences can be used to set or adjust thresholds associated with an audience trait. This disclosure includes several examples of thresholds associated with an audience trait. For example, the gateway device may provide for more granular content access control by utilizing refined thresholds that are more specific than certain general thresholds. Furthermore, the gateway device may predict thresholds based on previous authorizations, or based on policies extrapolated from other thresholds. Using predictive thresholds, the gateway device can use previous decisions and existing thresholds to determine whether to provide requested content to a particular audience. For example, if a parent has previously allowed a child to view PG-13 content with profanity, but has not allowed the child to view PG-13 content with violence, the gateway device may use the previous decision to generate a customized threshold based on the content's genre. Future content requests for a PG-13 movie may be accepted if the movie includes profanity, but denied if the movie includes violence. Although described in terms of movie content, this technology could also restrict access to music, games, multimedia, or other types of content.

The gateway device can dynamically modify content restrictions based on presence of a parent, adult, or caretaker who is also in the audience. For example, the gateway device may provide the requested content when a parent is in the audience. The parent may configure the gateway device to accept certain content requests when a babysitter or other authorized adult is in the audience. In some embodiments, parents can configure policies that are activated when a babysitter is in the audience. The policies may be more or less restrictive than if the babysitter were not in the audience.

Another aspect of the disclosure may be used to copy or move configuration information from a first gateway device to a second gateway device. For example, gateway configuration information (e.g., policies, etc.) used at a home may also be used in a vacation property, hotel, etc. The configuration information may be "exported" from the home gateway device to a storage device or cloud network service, and then "imported" to another gateway device at another location. If available configuration information includes more than one policy, the new gateway device may resolve differences between policies. For example, two families sharing a vacation home may have different policies implemented at the gateway device. Given the different policies, the gateway device may determine which persons are at the media output device and implement the most restrictive policy. Alternatively, if the content is restricted for any of the family members currently in the room, the gateway can prevent the content from being sent to the room.

FIG. 1 is a diagram depicting a system for enforcing content restriction policies, in accordance with an embodiment of this disclosure. In FIG. 1, the system 100 includes a media output device 150 located in a room 101. Although the media output device 150 is depicted as a television, it can be any device which presents content using any combination of audio, visual, and/or sensory output perceptible by a person. In FIG. 1, a first person 170 is viewing the media output device 150. The media output device 150 may be presenting content from a content source 110 (such as an online streaming movie service or the like). The content source 110 is providing the content via a network 120 to a gateway device 130. In one example, the gateway device 130 may be a residential gateway or router that provides Internet access for a plurality of devices in a home. The gateway device 130, network 120, and content source 110 may be in a different room 190 than the room 101 having the media output device 150. A connection 152 between the media output device 150 and the gateway device 130 may be used by the gateway device 130 to deliver the content to the media output device 150. The connection 152 may be any type of wired or wireless connectivity between the media output device 150 and the gateway device 130. For example, the connection 152 may be provided via wireless signals, powerline communications (PLC), multimedia over coax (MoCa), Ethernet, or any other type of network communications medium. In one example, the content may be provided to the media output device 150 via a set-top box 140. The set-top box 140 may have a connection 142 to the gateway device 130 (any type of wireless or wired connectivity) and may convert the content from a stream of digital packets to a video format that is provided to the media output device 150.

In accordance with this disclosure, the gateway device 130 may also have a connection 162 (wired or wireless) to a trait capture device 160 in proximity to the media output device 150. The trait capture device 160 is in proximity of the media output device 150 when located anywhere it can capture traits of persons in an audience of the media output device 150. In FIG. 1, the trait capture device 160 is represented as a camera. In some examples, the trait capture device 160 may be integrated with the media output device 150. In other examples, the trait capture device 160 may be collocated or near the media output device 150. In yet another example, the trait capture device 160 may be part of a home security or home automation system. For example, homes may be equipped with person detectors for regulating lighting and/or air conditioning systems. In the example of FIG. 1, where the trait capture device 160 is a camera, the camera may be part of a gaming system, a video telephony system, user interface to a television or any other type of equipment that has a camera.

The gateway device 130 may be communicatively coupled to the trait capture device 160, such that it can obtain biometric data from the trait capture device 160. For example, the trait capture device 160 may provide images from the room 101 to the gateway device 130. The gateway device 130 may perform pattern recognition, such as facial recognition, to determine persons in the room 101. The pattern recognition may be performed at the gateway device 130, at the trait capture device 160, or at another device. Regardless of where the pattern recognition is performed, the gateway device 130 can determine an audience trait, for an audience of the media output device 150, based on biometric data from the trait capture device 160. Because the trait capture device 160 is near the media output device 150, the gateway device 130 may assume that persons identified by the biometric data are part of the audience for the media output device 150.

An audience trait can describe at least one of an identity, an estimated age, a psychological trait, an emotional state, and a membership in a predefined class of persons. For example, the gateway device 130 can use facial recognition to identify the first person 170. After identifying the first person 170, the gateway device 130 can determine the audience trait based on a profile for the first person 170. The audience trait can include a name, age, or other characteristics describing the first person 170. In another example, if gateway device 130 cannot identify the first person 170 using facial recognition 172, the audience trait may be an estimated age or age range based on the biometric data. For example, even if the facial recognition 172 does not identify a person, the gateway device 130 can use facial recognition 172 to locate a face in a camera image, and estimate a person's age associated with the face. Alternatively, or in addition to facial recognition 172, other biometric data, such as height, body shape or proportions, or other information may be used to estimate the audience trait. As more sophisticated trait capture devices are employed, the audience trait may also become more sophisticated. For example, pattern recognition using biometric data from the trait capture device 160 may be used to estimate the psychological (e.g., stressed, relaxed, anxious) or emotional state (e.g., happy, sad, scared) of the first person 170. Identifying the person or characteristics of the person may also be used to determine whether the person is a member of a predefined class or persons. The predefined class of persons can refer to any grouping of individuals for which separate thresholds would apply.

The gateway device 130 can use the audience trait to determine whether to transmit the content to the media output device 150. As an example, if the audience trait reflects that the first person 170 is an adult, the gateway device 130 may provide requested content to be presented via the media output device 150. In an example scenario presented in FIG. 1, a second person 180 enters the room 101. The biometric data from trait capture device 160 is used to detect the presence of the second person 180. Pattern recognition, (such as facial recognition 182) may be used to estimate an age of the second person 180. If the second person 180 is a child, the gateway device 130 may not provide content that is not acceptable for the child.

When determining whether to provide content to the media output device 150, the gateway device 130 may evaluate a content attribute and the audience trait. In a first example, the content attribute may be an age-based content rating. For example, the Motion Picture Association of America (MPAA) provides content ratings for movies. Other examples of content attributes include television ratings systems and Entertainment Software Review Board (ESRB) ratings. Several countries have established ratings systems for media.

The gateway device 130 can determine whether to grant a content request by evaluating a content attribute and an audience trait. If the combination of content attribute (e.g., PG-13 MPAA rating) and audience trait (e.g., youngest age is 15) is acceptable, the gateway device 130 will provide the requested content. However, the gateway device 130 may restrict access to the content (i.e., stop providing the content) in response to a change in the audience, such as in FIG. 1 when a second person 180 enters the room, and the audience trait adjusts to reflect the new audience. In one example, the audience trait may be a lowest common characteristic (such as the age of the youngest person) of the audience.

Figure 2:
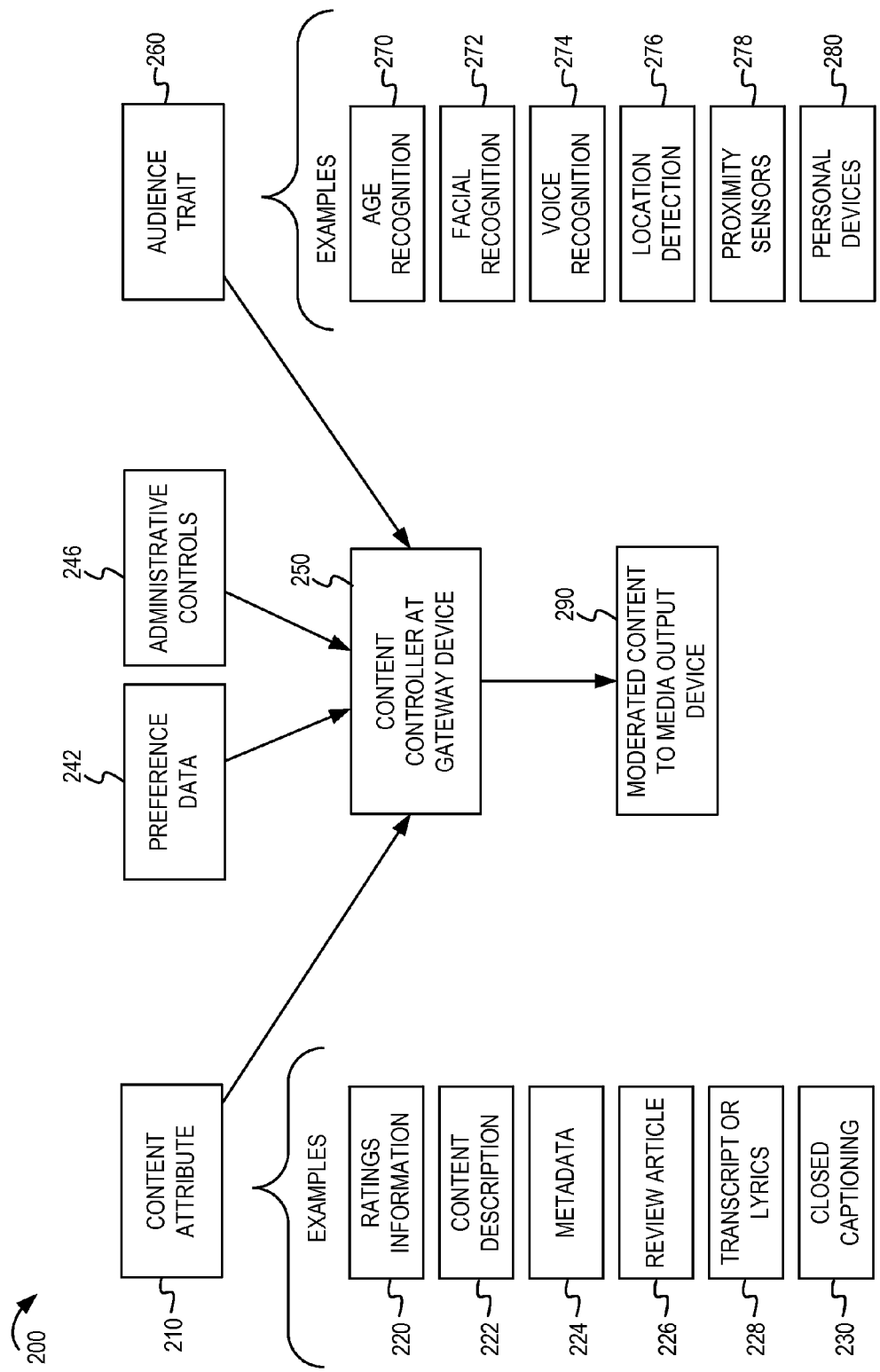
FIG. 2 depicts a diagram describing information used in determining whether a gateway device should provide content to a media output device, according to some embodiments of this disclosure.

FIG. 2 depicts a diagram describing information used in determining whether a gateway device should provide content to a media output device. As described previously, a content attribute 210 may be used to describe the content. The content attribute 210 may be represented as a metric or may be represented as language. The content attribute 210 may be determined a variety of ways. FIG. 2 provides several example sources of content attributes. The examples include ratings information 220 (as described previously), a content description 222, metadata 224, a review article 226, a transcript or lyrics 228, or closed captioning 230. Metadata refers to any information about the content. The metadata may be embedded with the content, included with the content from a content source, or obtained from a metadata source that is different from the content source.

In some examples, the content attribute 210 may be obtained directly from the content. For example, some types of closed captioning 230 may be embedded in a video content item. Closed captioning (sometimes referred to as subtitles) refers to text or other additional interpretive information that is presented in conjunction with the content. Closed captioning can be used to present descriptions of non-speech elements, translation of language, or transcription of dialogue, or the like. Closed captioning can also be used to present descriptions of sound effects or other audio information when the sound is unavailable or inaudible (such as when a viewer is hearing impaired). In other examples, the content attribute may be obtained from another source, such as a metadata source. For example, IMDb.com, Inc. provides a website which provides information about movies, television, and celebrities. Other metadata sources may be available to provide content attributes. For example, a metadata sources may be a news or review source that maintain a repository of reviews regarding content. Metadata sources for content ratings or parental advisory information may be queried by the gateway device to obtain metadata about the content.

The content attribute describes one or more features of the content. As will be explained, the content attribute may be used with policies and thresholds to determine if the content is appropriate for an audience. In this disclosure, the gateway device characterizes the audience using an audience trait 260. The audience trait 260 identifies persons in the audience or characteristics about the persons in the audience. The audience trait 260 may be determined a variety of ways, including age recognition 270 (estimated age or age range), facial recognition 272, voice recognition 274, location detection 276, proximity sensors 278, and personal devices 280. In some implementations, the audience trait is determined by a combination of these examples. For example, the media output device 150 may first roughly approximate the locations of various persons in a building or home based on their personal devices 280 or using biometric data from proximity sensors 278. The media output device 150 may then obtain biometric data from one or more trait capture devices (such as sensors, cameras, microphones, and the like) to further perform pattern recognition for the persons. By combining information from multiple sources, the gateway device 130 may develop an accurate audience trait 260 representing the audience that is currently physically present as an audience for a media output device 150.

In addition to the content attribute 210 and the audience trait 260, other information may be used to determine whether to provide requested content through the gateway device. For example, preference data 242 and administrative controls 246 may impact the content control at the gateway device 250. Preference data 242 may describe polices and thresholds. FIGS. 10-13 provide several examples of thresholds in accordance with this disclosure. For example, thresholds may be specific to different audience traits. In an age-based scenario, the thresholds may change depending on the age reflected by the audience trait 260. In another example, if the content attribute 210 is a language-based attribute, the thresholds may be based on a count of profanity included in a description, a review article, transcript or lyrics, or closed captioning. The administrative controls 246 may provide options to configure or override the determinations of the gateway device 250. A history of authorizations or override may be maintained and included with the preference data 242.

Shown in FIG. 2, the content controller at the gateway device 250 may consider the content attribute 210, preference data 242, administrative controls 246, and the audience trait 260 in determining whether to send content to a media output device. The content may be fully or partially restricted in different embodiments. For example, the content may be sent in an altered form to the media output device, such as when the gateway device alters, removes, or obscures portions of the content. Alternatively, if the content attribute 210 exceeds a threshold associated with the audience trait 260, then the content may be restricted (e.g., filtered, censored, or prevented) by the gateway device without being sent to the media output device. Therefore, the gateway device performs a moderating feature to dynamically provide moderated content to the media output device (shown at 290) or withhold the content.

FIG. 3 depicts an example system including a gateway device, content source, and network, according to some embodiments. The gateway device 130 can also communicate with media output devices and trait capture devices in a local network. FIG. 3 illustrates several example media output devices and trait capture devices. A computer 310 may be communicatively coupled to the gateway device 130. The computer 310 may be considered a media output device because it can present content to a user. Additionally, the computer 310 may be considered a trait capture device because it may include peripherals (such as a camera, microphone or the like) which could provide biometric data to the gateway device 130. The computer 310 may also provide login status of a person logged in to help validate or improve the accuracy of a determined audience. Similar to the computer 310, a mobile phone 320 or tablet 330 may be considered both media output devices and trait capture devices. In FIG. 3, the mobile phone 320 and the tablet 330 may communicate with the gateway device 130 via wireless nodes 323, 333. The wireless nodes 323, 333 may be a wireless local area network access point (WLAN AP) or a home base station (e.g., a Home eNB). In some implementations, one or both of the wireless nodes 323, 333 may be integrated with the gateway device 130.

Also shown in FIG. 3 is a game system 340 which is communicatively coupled to the gateway device 130. The game system 340 may be a media output device if it presents content (such as video, music, games, or the like) from the content source 110 to a user of the game system 340. Some game systems also include trait capture devices, such as sensors and/or cameras for detecting persons using the game system. The game system 340 may provide biometric data to the gateway device 130 or may process the biometric data at the game system 340 and send an audience trait (based on the biometric data) to the gateway device 130.

Other examples of media output devices include a television 350, and set-top box 360. Other media output devices (not shown) can be conceived, and include displays in furniture or appliances, home entertainment systems, stereos, and the like.

The gateway device 130 may also be communicatively coupled to a security or automation system 370. For example, the automation system 370 may include a processor for controlling lighting, air conditioning, locks, motion detectors, and the like. As a trait capture device, the automation system 370 may provide biometric data or status information to the gateway device 130 to aid the gateway device 130 in determining possible locations of persons in a building. For example, if the automation system 370 includes a capability of detecting persons in rooms of a building, the gateway device 130 may determine a set of potential persons and corresponding locations. From the set of potential persons and corresponding locations, the gateway device 130 may refine an estimate of which persons comprise the audience for a particular media output device.

Other sensors or detectors 380 may also be communicatively coupled to the gateway device 130. For example, proximity sensors, short range radio frequency detectors, wearable devices, or the like may provide biometric data to the gateway device 130.

Figure 4:
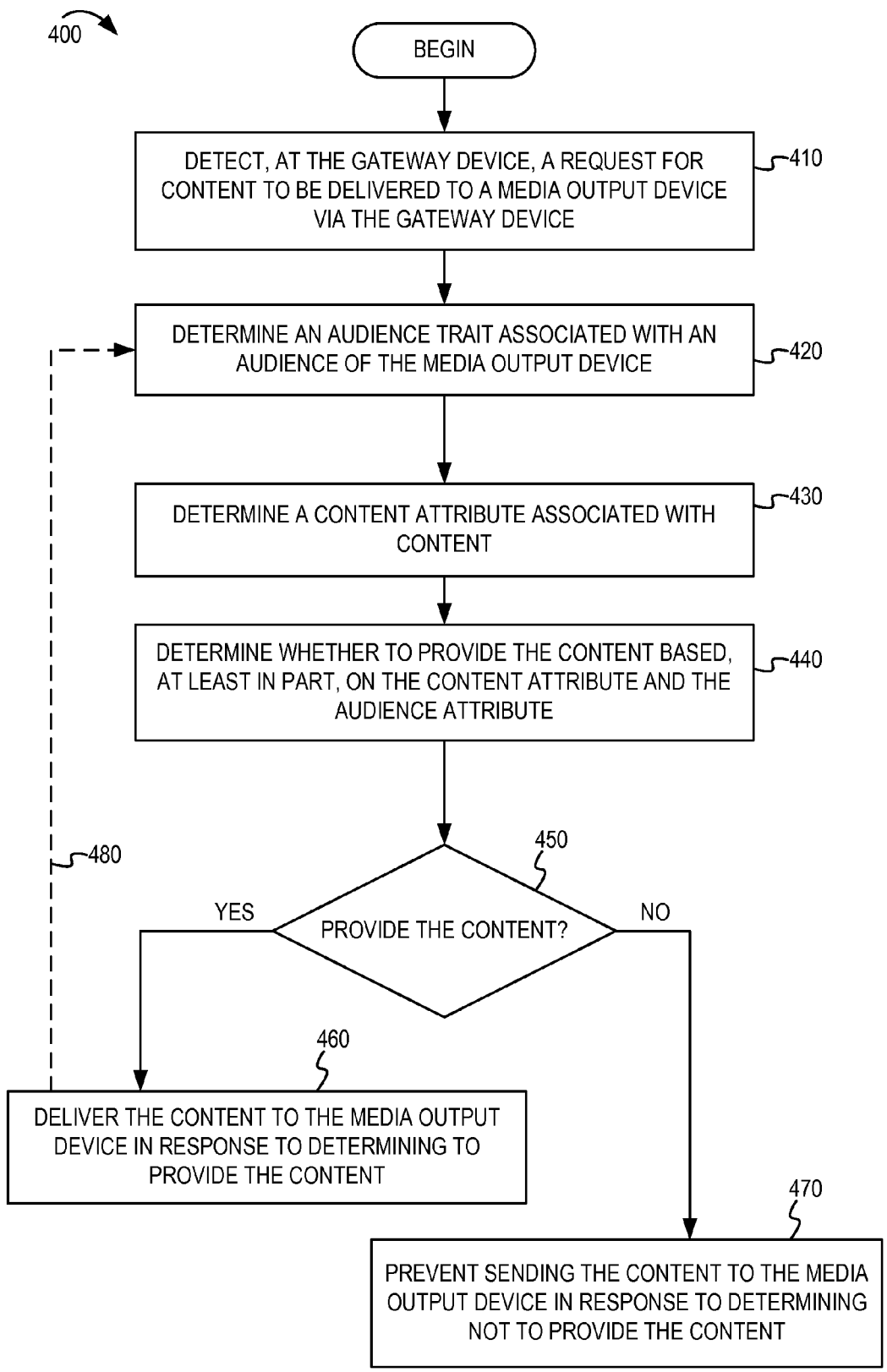
FIG. 4 depicts a flow diagram including operations for controlling access to content based, at least in part, on a content attribute and an audience trait, in accordance with an embodiment of this disclosure.

FIG. 4 depicts a flow diagram including operations for controlling access to content based, at least in part, on a content attribute and an audience trait, in accordance with an embodiment of this disclosure.

At 410, the gateway device detects a request for content to be delivered to a media output device via the gateway device. For example, gateway device may inspect packets from a media output device to determine if the packets include a request for content. In one implementation, detecting the request for content may include intercepting a request directed from the media output device to the content source. In another implementation, the gateway device may operate as a proxy for the media output device.

At 420, the gateway device determines an audience trait associated with an audience of the media output device. For example, the gateway device may employ facial recognition to determine an age of one or more audience members. The gateway device can determine various audience traits using other techniques, such as voice recognition, location detection, etc.

At 430, the gateway device determines a content attribute associated with content. For example, the content attribute may come from metadata associated with the content. The gateway device may obtain the metadata from the content store or from a metadata source different from the content source.

At 440, the gateway device determines whether to provide the content. In some embodiments, the gateway device compares the content attribute (determined at 430) to a threshold associated with the audience trait. If the content attribute is within the audience trait threshold, the gateway device will provide the content. Otherwise, the gateway device will not provide the content. The discussion of FIG. 14 explains operations for determining whether to provide the content using one or more thresholds.

At 450, if the gateway device provides the content, the flow diagram 400 continues to 460. Alternatively, 450, if the gateway device does not provide the content, the flow diagram 400 continues to 470.

At 460, after determining to provide the content, the gateway device delivers the content to the media output device. At 470, after determining not to provide the content, the gateway device filters the content.

Shown at 480, the gateway device may repeat portions of the flow diagram 400 beginning at 420. For example, the gateway device may continuously monitor biometric data to determine changes in the audience. Upon detecting a change to the audience, a new audience trait may be determined and used to determine whether to provide the content to the changed audience.

As discussed with reference to FIG. 4, gateway devices determine audience traits as part of controlling access to content. The discussion of FIG. 5 explains operations for determining an audience trait.

Figure 5:
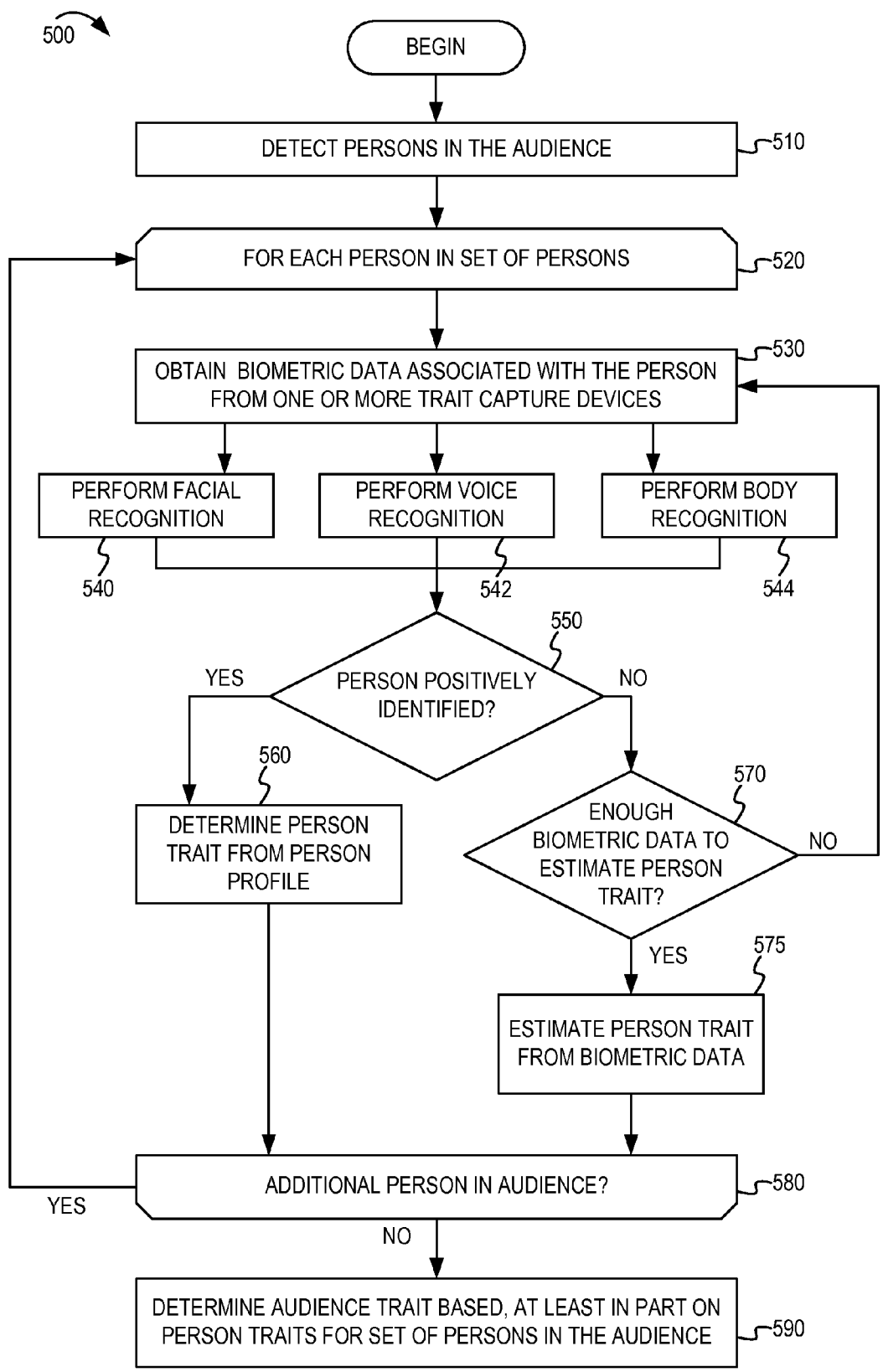
FIG. 5 depicts a flow diagram including operations for determining an audience trait, in accordance with an embodiment of this disclosure.

FIG. 5 depicts a flow diagram including operations for determining an audience trait, in accordance with an embodiment of this disclosure. Beginning at 510, the gateway device detects persons in an audience. For example, the gateway device may obtain data from computing devices, sensors, detectors or other trait capture devices to determine that persons have formed an audience of a media output device. There may be one or more persons in the audience. Then, the gateway device may perform operations 520 to 580 for each person in the audience.

At 530, the gateway device obtains biometric data associated with the person from one or more trait capture devices. For example, the gateway device 130 may access images from a camera, obtain audio from a microphone, or obtain biometric data from a game system. Depending on the type of biometric data available, the gateway device may perform different pattern recognition operations.

At 540, the gateway device may perform facial recognition using images from a camera. Facial recognition may include identifying markers in the image with a model of a face. In some facial recognition techniques, a three dimensional (3D) model of a face may be used to identify a person from just a portion of a face. Alternatively, the facial recognition may be used as part of age recognition to estimate an age or age range of the person. At 542, the gateway device may perform voice recognition using audio from a microphone. The voice recognition may be used to identify a person, or may be used to estimate an age of the person. For example, duration of vowels and consonants, speed of speech, pitch, language (such as certain words), and/or breadth of vocabulary may be used to estimate an age of a person from voice recognition. At 544, the gateway device may perform body recognition from biometric data. For example, a ratio of a length of a limb to the height of a body may be an indicator of age range. In another example, a proportion of a head size in relation to a body may be used to estimate an age. Other types of body recognition may be used to identify a person or determine characteristics about the person.

At 550, if the person is positively identified (e.g., identified as a particular person associated with a stored person profile), the flow diagram 500 continues to 560. Alternatively, at 550, if the person is not positively identified, the flow diagram 500 continues to 570.

At 560, after positively identifying the person, the gateway device may determine a person trait from a person profile associated with the positively identified person. For example, a gateway device may have access to person profiles that include names and ages of household members. Upon identifying a person from the household members, the gateway device may obtain the name and age from a person profile for that person.

At 570, because the person is not positively identified, the gateway device may determine if it has enough biometric data to estimate a person trait for the person. For example, the gateway device may have detected a face in the facial recognition at 540, but did not positively identify the person at 550, and therefore may have lower confidence in an age estimate for the person. At 570, if the gateway device does not have enough biometric data to estimate the person trait, the gateway device may perform more instances of operations at 530, 540, 542, 544, and 550. For example, if the first biometric data was used for facial recognition, the gateway device may obtain additional biometric data to perform voice recognition. By combining biometric data from more than one trait capture device, or by performing more than one pattern recognition operation, the gateway device may improve accuracy of the person trait.

At 570, if the gateway device has enough data to estimate the person trait, the flow diagram 500 continues to 575. At 575, the gateway device estimates the person trait based, at least in part, on the biometric data. At 580, the flow diagram 500 returns to 520, if there is an additional person in the audience. Although shown iteratively, the processing of biometric data for each person may be performed in parallel operations.

At 590, after determining person traits for each person in the audience, the gateway device may determine an audience trait based, at least in part on the person traits. The audience trait may be based on a maximum, a minimum, an average, or some other relationship between the person traits. Referred to as a lowest common characteristic, the audience trait may also be whichever person trait would result in the most restrictive threshold for the content attribute.

Using FIG. 5, the scenario of FIG. 1 may be described. For example, at 510, the gateway device may determine there are two persons (first person 170 and second person 180) in the room 101. For the first person 170, the gateway device may not positively identify the person from facial recognition, but can estimate the age of first person 170 from a combination of facial recognition and body recognition using biometric data from trait capture device 160. The gateway device may estimate the age of first person 170 as an adult in mid 40s. For the second person 180, the gateway device may have a person profile for a child living in the household and may positively identify the first person 170 as "Jane." The person profile for "Jane" indicates that she is 7 years old. Based on the persons in the audience, the gateway device may use the age 7 as the audience trait for selecting a threshold or content policy.

Although described as operations performed by a gateway device in FIG. 5, some of the operations described in FIG. 5 may be performed by another device. For example, some or all of the pattern recognition techniques at 540, 542, and 544 may be performed by a processor that is separate from the gateway device.

Figure 6:
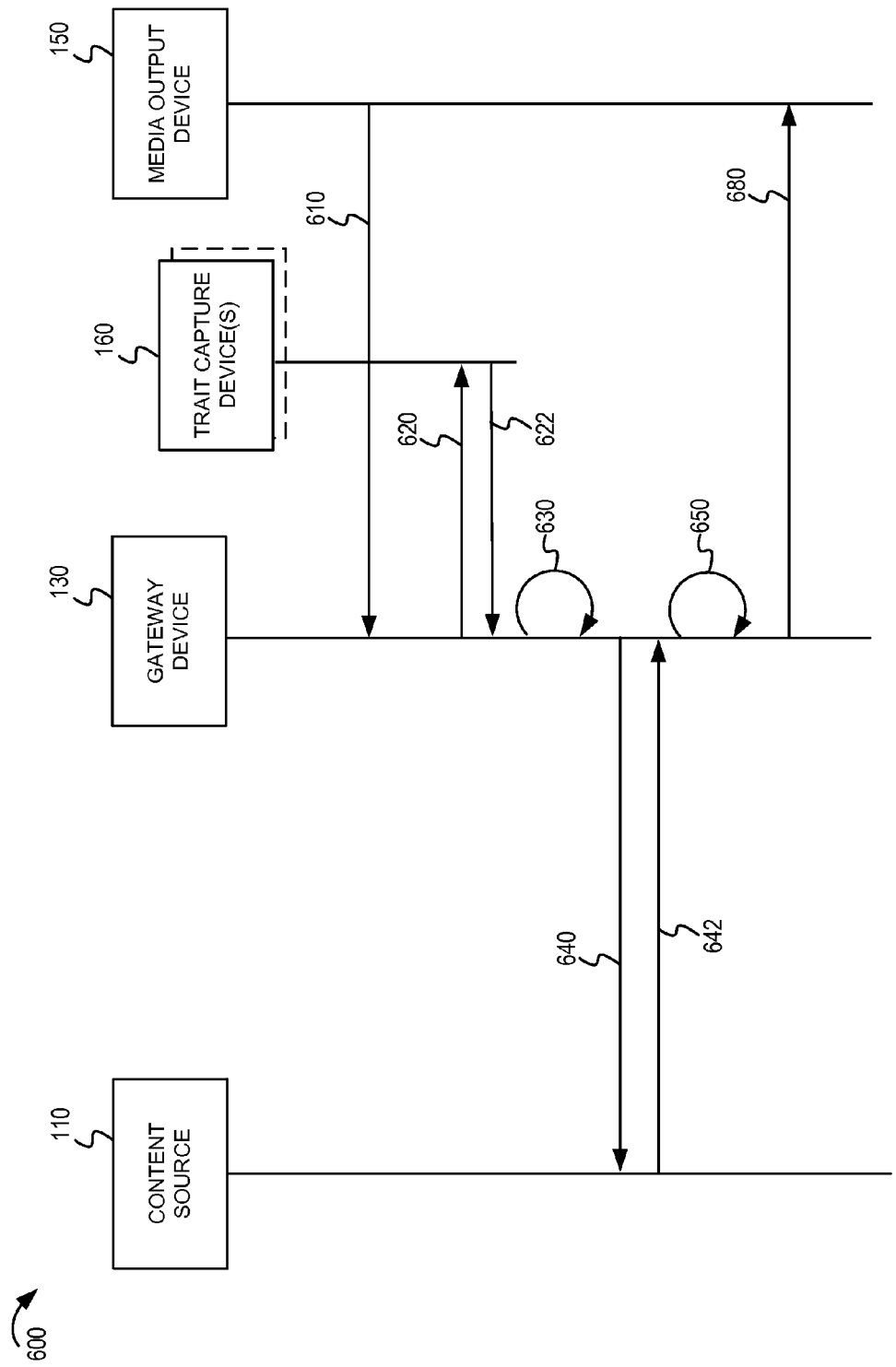
FIG. 6 depicts a flow diagram in which person detection is responsive to a request for content, in accordance with an embodiment of this disclosure.

FIG. 6 depicts a diagram illustrating operations for detecting an audience after a content request, according to an embodiment of this disclosure. The diagram 600 shows communications and operations between a content source 110, a gateway device 130, a media output device 150, and one or more trait capture device(s) 160. At 610, the gateway device 130 detects a request for content from the media output device 150. In determining whether to provide the content to the media output device 150, the gateway device 130 performs procedures to determine an audience trait. At 620, the gateway device 130 may send a query to the trait capture device 160 to obtain identity and/or biometric data from the trait capture device 160. The trait capture device 160 may be in proximity of the media output device 150. For example, the trait capture device(s) may be said to be collocated, within a distance range, or in proximity to the media output device 150. At 622, the gateway device 130 may receive the biometric data. At 630, the gateway device 130 determines an audience trait about the audience of the media output device 150.

At 640, the gateway device 130 may forward the request for the content to the content source 110. At 642, the content (or a portion of the content) may be received by the gateway device 130. At 650, the gateway device 130 may determine a content attribute from the content and determine whether the content attribute is within a threshold associated with the audience trait. For example, the gateway device 130 may determine a content rating from metadata included in or with the content. If the content rating is within a threshold for the audience trait, the content may be delivered at 680 to the media output device 150.

In one variation, the gateway device 130 may continuously inspect the content before sending the content to the media output device 150. For example, at 650, the gateway device 130 may buffer content as the content is received and process the buffered content to determine the content attribute for the processed portion. In one example, the gateway device 130 may decode media content to extract closed captioning data from the media. Based on a lack of restricted terms (such as profanity) in the closed captioning, the gateway device 130 may forward the buffered content to the media output device 150. This may occur in "real-time" (or near real-time) so that the content is delayed only briefly at the gateway device 130 during the processing. Alternatively, or in addition to closed captioning data, the decoded media may be processed to identify images (such as bloody violence, nudity, etc.) or speech (such as verbal profanity, violent language, etc.). Depending on the audience trait, inappropriate content may be filtered or censored by the gateway device 130 before sending filtered content to the media output device 150. Filtering or censoring may include removing or obstructing brief portions of the image or sound in the content.

Figure 7:
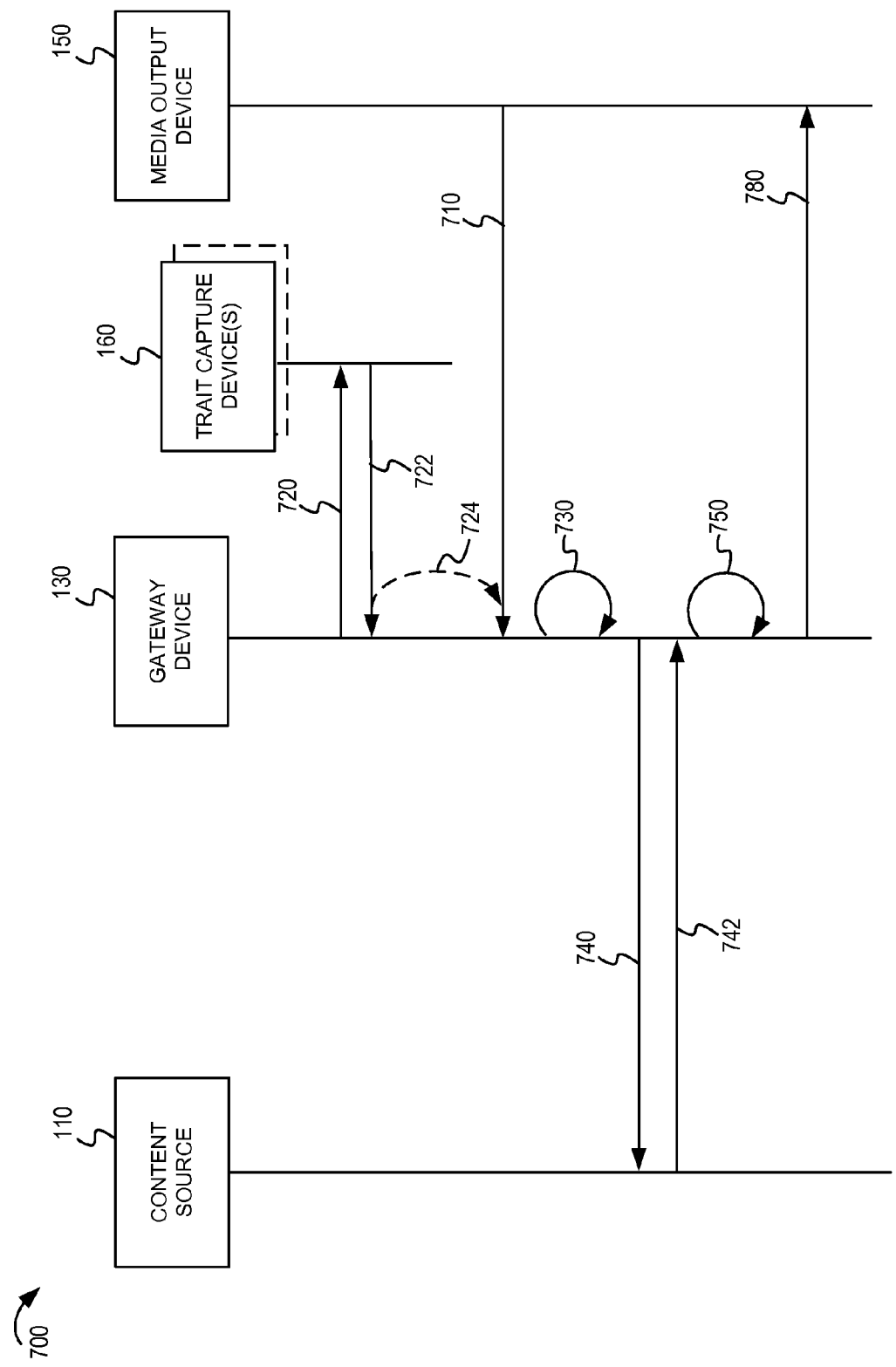
FIG. 7 depicts a diagram illustrating operations for detecting an audience before receiving a content request, in accordance with an embodiment of this disclosure.

FIG. 7 depicts a diagram illustrating operations for detecting an audience before receiving a content request, in accordance with an embodiment of this disclosure. The diagram 700 shows communications and operations between a content source 110, a gateway device 130, a media output device 150, and one or more trait capture device(s) 160. In FIG. 7, the gateway device 130 may maintain information about the presence of persons in proximity to media output devices. For example, at 720, the gateway device 130 may send a query to the trait capture device 160 to obtain biometric information associated with one or more persons in the audience. At 722, the gateway device 130 may obtain the biometric data and determine an audience trait of the one or more persons in the audience (e.g., persons near the media output device 150). The operations at 720 and 722 may occur before the gateway device 130 detects a request for content from the media output device 150 at 710. The gateway device 130 may use the previously determined audience trait at 724 in coordination with the request for content. Based on the audience trait and the request for content, at 730 the gateway device 130 may determine whether to forward the request to the content source 110. At 740, the gateway device 130 may send the request for content to the content source 110. At 742 the gateway device 130 receives the content and then processes the content at 750 to determine whether to provide the content to the media output device 150. At 780, if the gateway device 130 determines to provide the content (e.g., based on the audience trait and content attribute) to the media output device 150, the gateway device 130 transmits the content to the media output device 150.

Figure 8:
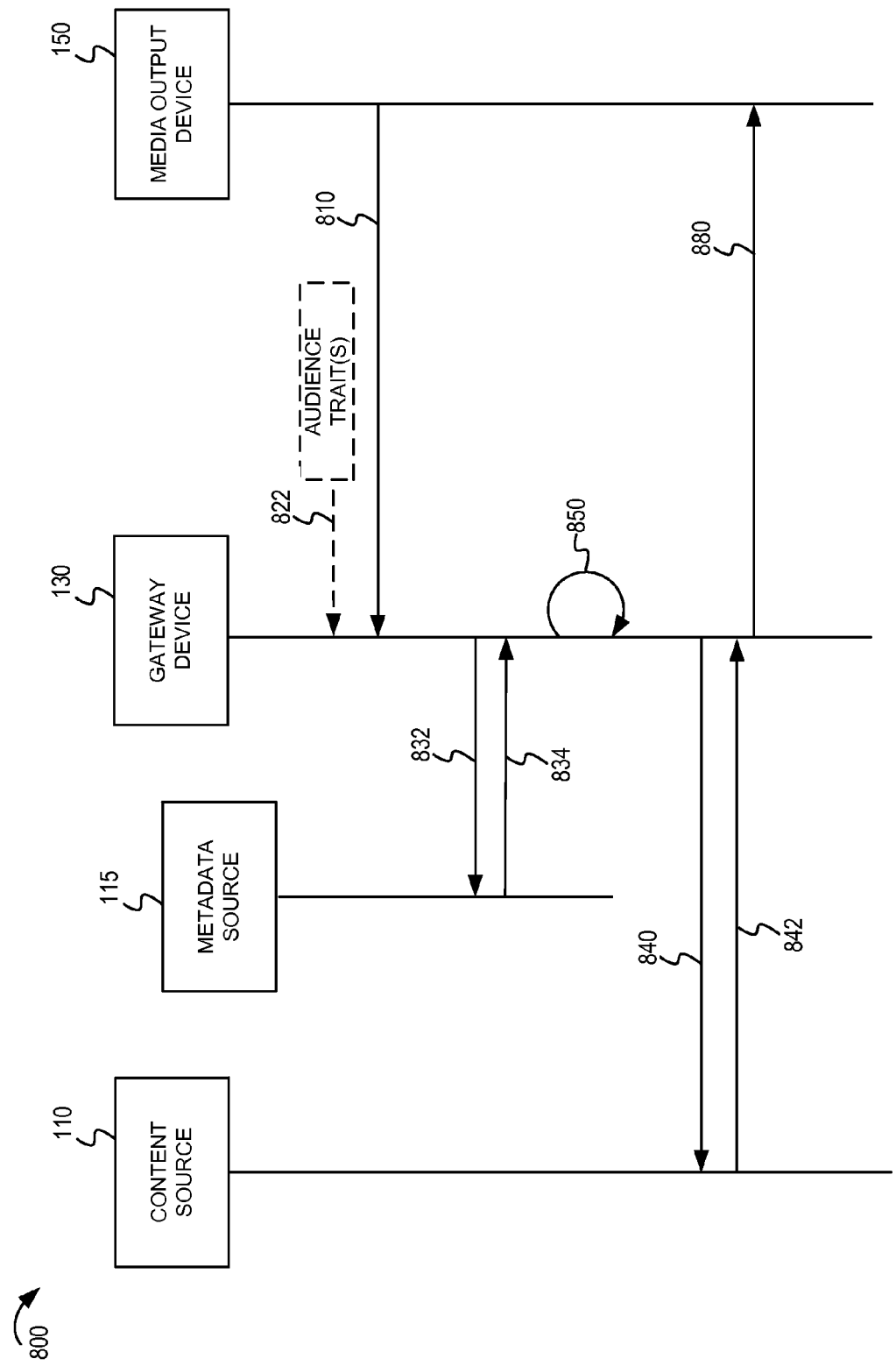
FIG. 8 depicts a flow diagram in which a gateway obtains metadata about the content from a metadata source, in accordance with an embodiment of this disclosure.

FIG. 8 depicts a diagram in which a gateway obtains metadata about the content from a metadata source, in accordance with an embodiment of this disclosure. The diagram 800 shows communications and operations between a content source 110, a gateway device 130, a media output device 150, and a metadata source 115. At 810, the gateway device 130 detects a request for content from the media output device 150. At 822, the gateway device 130 determines the audience trait(s). The process for determining the audience trait may be similar to that which is described in FIGS. 6, 7, and elsewhere in this disclosure.

At 832, the gateway device 130 may request metadata about the content from the metadata source 115. For example, the gateway device 130 may query a resource for a content rating, parent guide, review article, description, or other metadata about the content. At 834, the gateway device 130 receives the metadata. Using the metadata, at 850, the gateway device 130 determines whether the content attribute is within a threshold associated with the audience trait. If the content attribute is within the audience trait threshold, the gateway device 130 may request the content from the content source 110 at 840. The gateway device 130 receives the content at 842 and forwards the content to the media output device 150 at 880.

Figure 9:
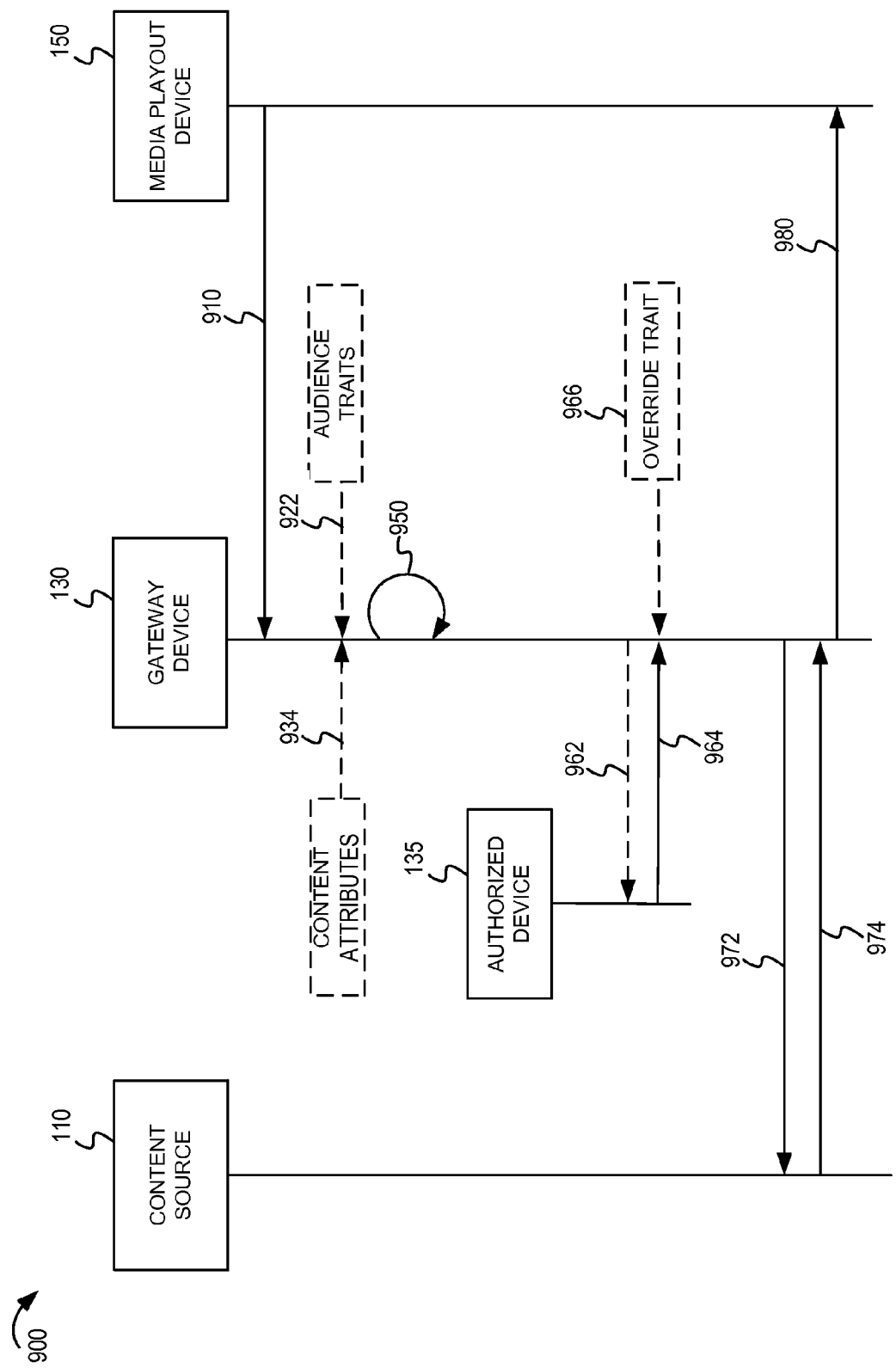
FIG. 9 depicts a flow diagram in which an override feature is implemented in accordance with an embodiment of this disclosure.

FIG. 9 depicts a diagram in which an override feature is implemented in accordance with an embodiment of this disclosure. The diagram 900 shows communications and operations between a content source 110, a gateway device 130, and a media output device 150. At 910, the gateway device 130 detects a request for content. For brevity, the process of determining the audience trait and content attribute is omitted from the description of FIG. 9, but would be performed in accordance with the corresponding operations in FIGS. 6-8, and elsewhere in this disclosure. At 950, the gateway device 130 determines to withhold the content based on the audience trait and content attribute.

FIG. 9 is provided to illustrate potential override conditions which may be used with embodiments of this disclosure. In one override condition, the gateway device 130 obtains authorization from an administrator. For example, at 962, the gateway device 130 may send a request the authorization. The request may be sent to an authorized device 135 associated with the administrator. For example, a message may be sent to a personal device of a parent. At 964, the gateway device 130 may receive the authorization from the authorized device 135. In response to receiving the authorization, the gateway device 130 determines that an override condition is satisfied and may proceed to request the content from the content source 110 at 972. At 974, the content is received by the gateway device 130 and sent to the media output device 150 at 980. The gateway device 130 may maintain a history of the override condition for future log retrieval by the administrator. Over time, the gateway device 130 may use the history of express authorizations to adjust the threshold or to predictively determine whether an override is likely to occur.

Also shown in FIG. 9 is another example override condition. At 966 the gateway device 130 may determine that there is a person in the audience that has an override trait. For example, if a parent is in the room, the gateway device 130 may consider the presence of the parent to be an implicit authorization to deliver the content. In a similar example, a parent may decide that a babysitter is allowed to override a limitation imposed by the gateway device 130. The parent may provide a distinguishing trait (such as possession of the personal device of the babysitter) to the gateway device 130 to establish an override trait.

FIGS. 10-13 illustrate several examples of thresholds which may be used to determine if content is appropriate for an audience. The thresholds are associated with an audience trait, so that as the audience trait changes, the threshold may also change. A content attribute can be compared against the threshold to determine whether to either provide the content or restrict access to the content. If the content attribute is not within the threshold, the gateway device may restrict access to some or all of the content. Although FIGS. 10-13 illustrate the thresholds using a Cartesian plane, the thresholds may be conceptually represented other ways. In an implementation, the thresholds may be represented as one or more policies and may or may not use scales to quantify a degree associated with the content attribute or the audience trait. Furthermore, although shown with linearity in FIGS. 10-13, the thresholds may not have a linear relationship between content attributes and audience traits.

Figure 10:
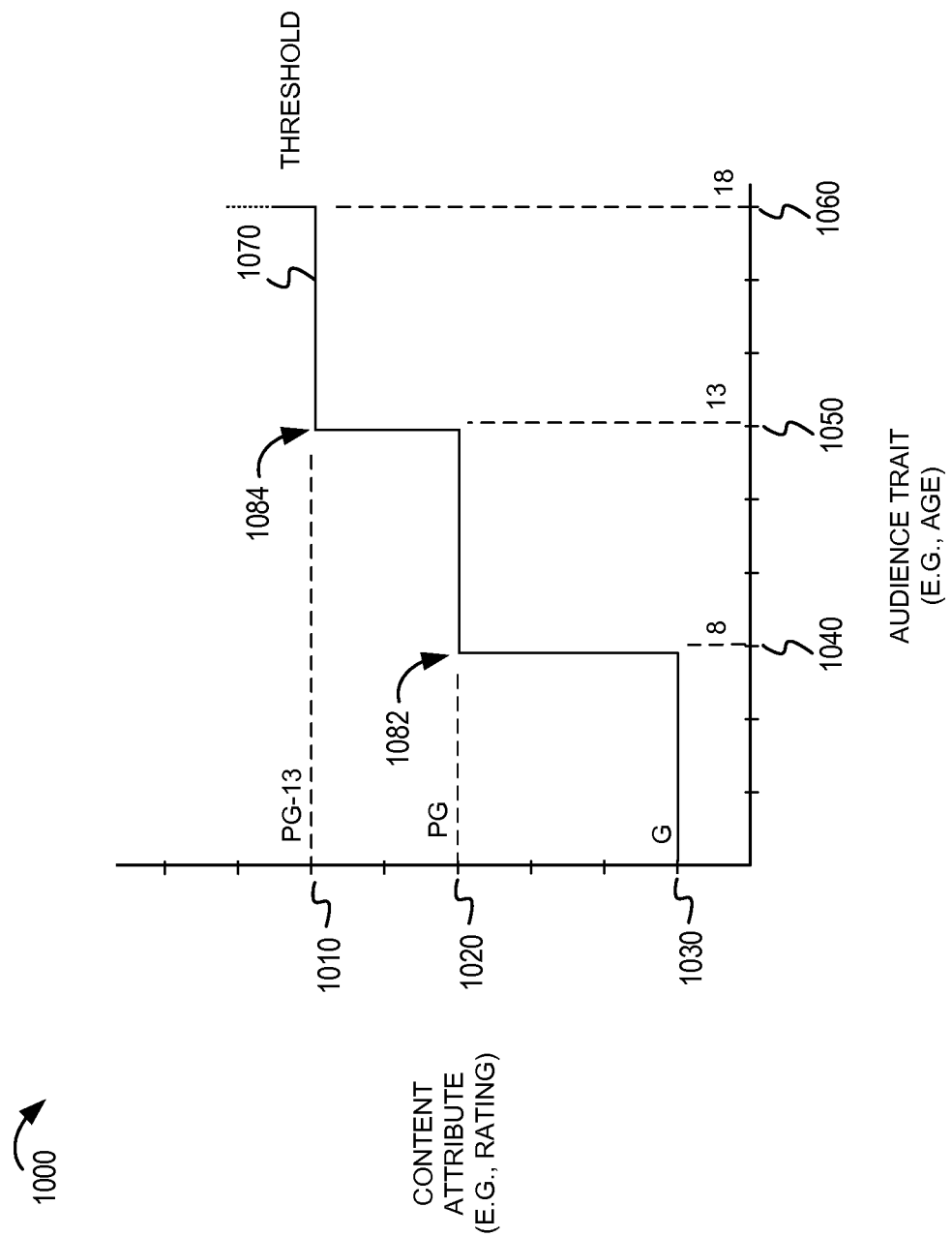
FIG. 10 depicts an example of a content attribute and a threshold associated with an audience trait, in accordance with an embodiment of this disclosure.

FIG. 10 depicts a chart showing the relationship between a content attribute and a threshold associated with an audience trait. In the chart 1000, the content attribute is a content rating. For illustrative purposes, the MPAA content ratings may be used in this example. A rating of General ("G") is shown at 1030 on the content attribute scale. A rating of Parental Guidance suggested ("PG") is shown at 1020 on the content attribute scale. A rating of Parents Strongly Cautioned ("PG-13") is shown at 1010 on the content attribute scale. Also shown in FIG. 10, the audience trait may be represented on another scale. At 1040, the audience trait is an age of 8. At 1050, the audience trait is an age of 13. And, at 1060, the audience trait is age 18.

A threshold 1070 is shown on the chart. The threshold for the content attribute may depend on the audience trait. For example, according to the example in FIG. 10, if the audience includes child younger than 8 years old, the threshold for the content attribute is "G" at 1030. A content having a higher content rating (e.g., "PG") would not be provided to the media output device having an audience with a child below 8 years old, because the content attribute is not within the threshold 1070 level set for ages below 8 years old at 1040. For ages 8 to 13, the threshold may increase to include "PG" at 1082. For ages 13-18, the threshold may increase to "PG-13" at 1084. In one embodiment, the threshold may be non-existent above a particular audience trait. For example, in FIG. 10, the threshold may be removed for ages above 18.

Figure 11:
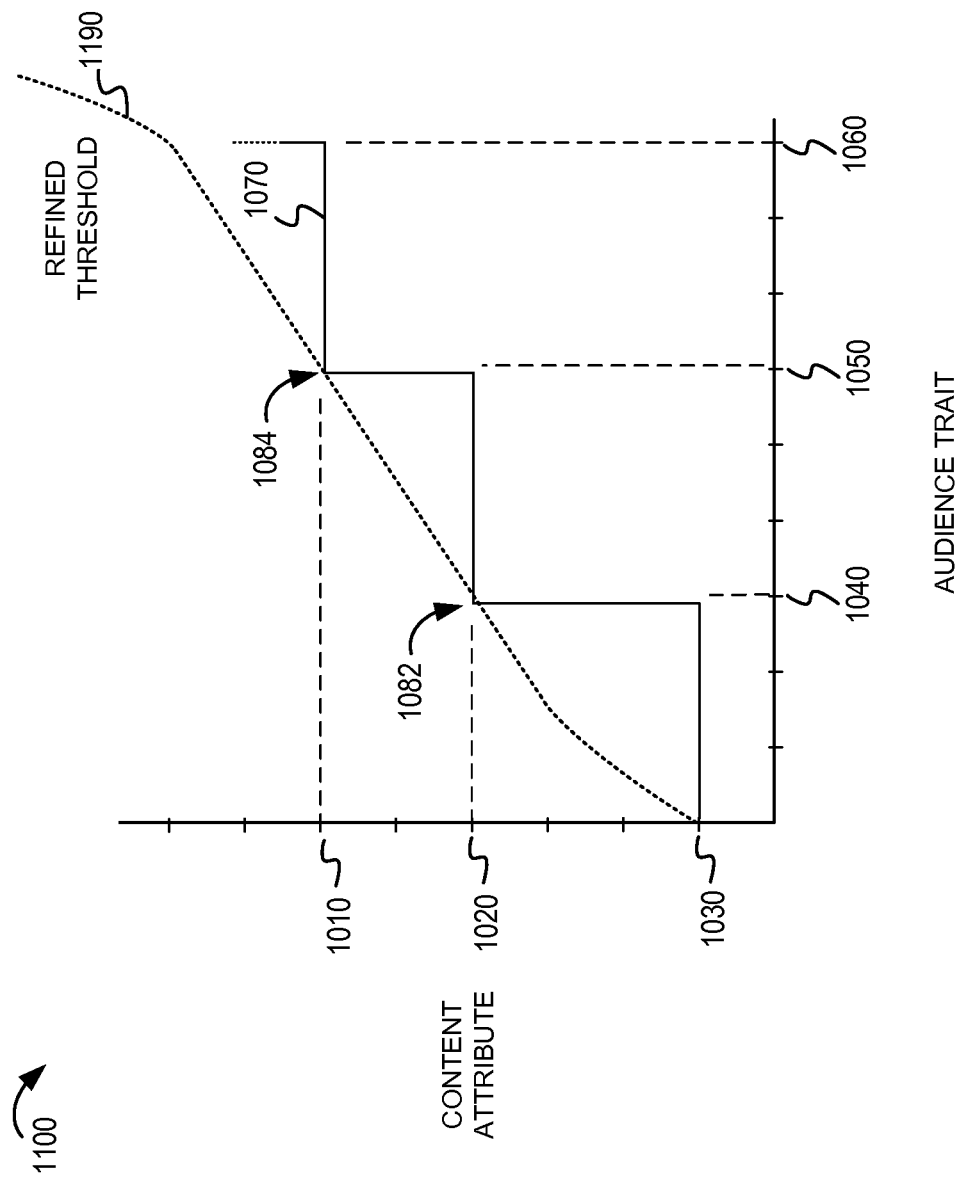
FIG. 11 depicts an example of a refined threshold associated with an audience trait for use with a content attribute, in accordance with an embodiment of this disclosure.

FIG. 11 depicts a chart showing a refined threshold. Similar to the features of FIG. 10, the threshold 1070 may include variable threshold levels of the content attribute depending on the audience trait. In accordance with an embodiment of this disclosure, the threshold may provide for more granularity and flexibility than might be provided previously. For example, a first movie that is rated PG-13 may be more or less inappropriate than a second movie rated PG-13. By using a different content attribute or combining content attributes, more flexibility may be provided in setting the threshold. Shown in chart 1100, a refined threshold 1190 may have the same thresholds at 1082 and 1084 as the original threshold 1070. However, the refined threshold 1190 may provide more granularity than the original threshold 1070.

Another aspect of the refined threshold 1190 in FIG. 11 is the predictive capability of the threshold by interpolating the threshold between coarse levels. Additionally, an administrator or parent may train the gateway device 130 by making determinations about content. For example, as the administrator or parent provides determinations whether the content can be provided for an audience, the gateway device may discover patterns in the determinations to create a refined threshold. In other words, the gateway device 130 may learn from the determinations made by the administrator. The gateway device 130 may adjust the refined threshold 1190 based on the determinations. The gateway device 130 may also create predictive thresholds based on other information collected from an administrator or parent. For example, the administrator or parent may provide configuration data or may answer a series of survey questions. The information collected from an administrator or parent may be used by the gateway device 130 to create a predictive threshold, which can be refined based on subsequent determinations or further information collected from the administrator or parent.

Figure 12:
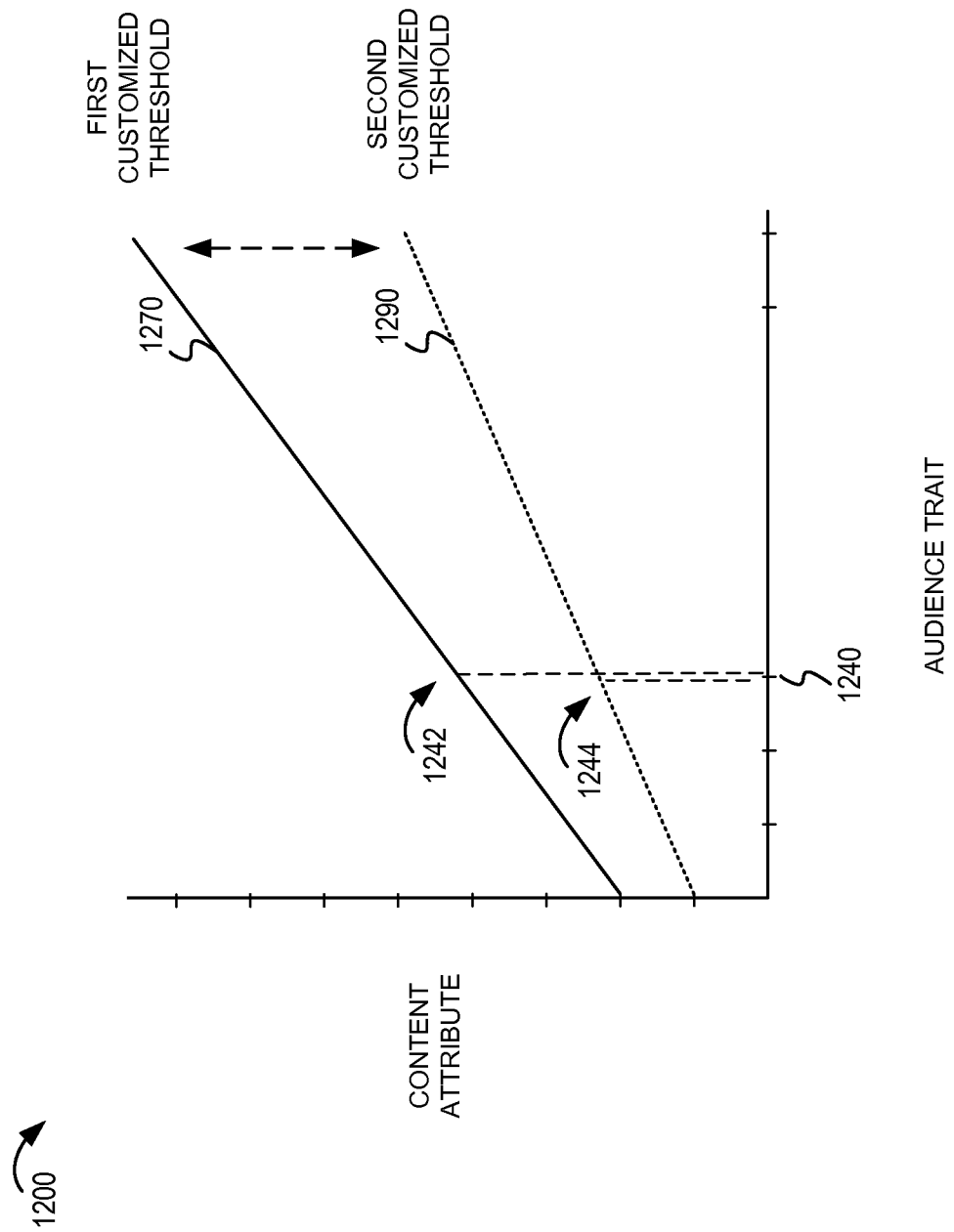
FIG. 12 depicts a chart having two example customized thresholds, in accordance with an embodiment of this disclosure.

FIG. 12 depicts a chart having two example customized thresholds. In chart 1200, a first customized threshold 1270 allows for higher values of the content attribute than a second customized threshold 1290. For example, when the audience trait is at 1240, the first customized threshold 1270 represents a higher threshold at 1242, and a lower threshold at 1244 for the second customized threshold 1290.

Using the two customized thresholds of FIG. 12, two scenarios are now described. In a first scenario, the customized thresholds may represent different preferences for the threshold associated with the content attribute. For example, the first customized threshold 1270 may be acceptable for a first family but may be too relaxed for a second family. The second family may desire the lower threshold of the second customized threshold 1290. Having the flexibility to adjust the threshold allows each family to suit their needs. Even within a family, a parent may customize a threshold based on a particular person. For example, consider a household which has two children the same age (such as adopted siblings, twins, etc.). However, the two children may not exhibit the same maturity, despite being the same age. A first child may be more mature than a second child. Even though both children may be the same age (such as the age associated with audience trait at 1240 in FIG. 12), the parent may desire to customize the thresholds for each child based on their maturity. When both children are in the audience, the lower threshold may apply. However, when the more mature child is in the audience without the less mature child, then the higher threshold may apply.

Another scenario which may be described with FIG. 12 is the use of customized thresholds for content of different types, classes, or genres. For example, the first customized threshold 1270 may be used for music while the second customized threshold 1290 may be used for movies. In another example, the first customized threshold 1270 may be used for movies of a first genre, while the second customized threshold 1290 may be used for movies of a second genre. As a further explanation, consider a family that would allow a child at age 10 to watch documentaries or biographical movies rated PG-13, but would not allow the child to watch science fiction or horror movies rated PG-13. Therefore, the threshold may be based on a class or genre of the content. Another way to implement the policy might be to qualify a threshold based on more than one content attribute. For example, the content attribute may be a combination of the genre and the content rating.

Figure 13:
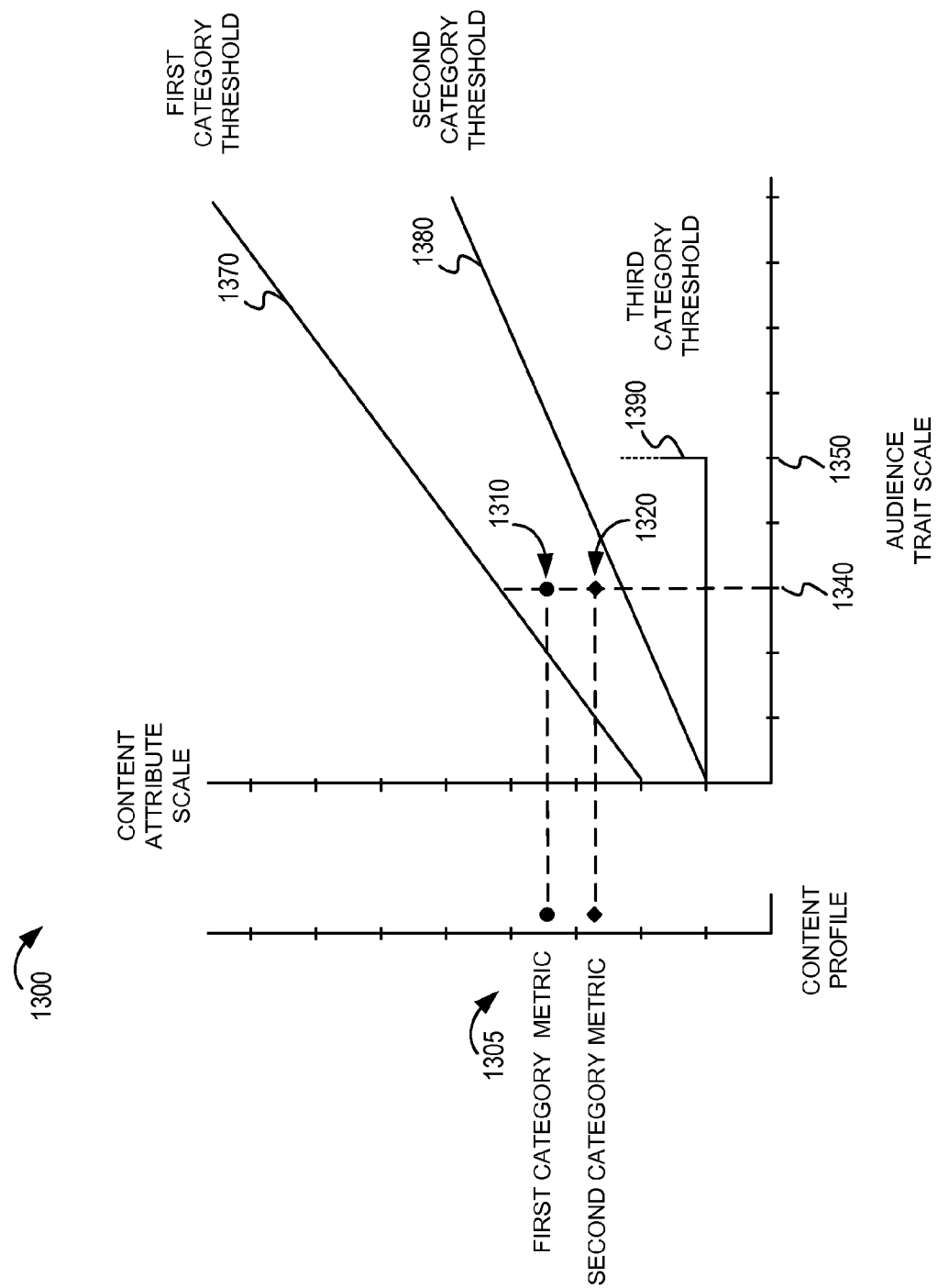
FIG. 13 depicts a chart with showing granular thresholds, in accordance with an embodiment of this disclosure.

FIG. 13 depicts a chart with showing granular thresholds. In chart 1300, a plurality of category thresholds are shown, including a first category threshold 1370, a second category threshold 1380, and a third category threshold 1390. The categories may relate to different metadata about the content. As an example, a metric may be assigned for each category to create a content profile about the content. Examples of categories that might be used for movies might include: "Sex and Nudity", "Violence and Gore", "Profanity", "Alcohol/Drugs/Smoking" and "Frightening/Intense Scenes." For each of these categories, a rating from 1 to 10 may be used to describe the level of each category present in the movie.

The category thresholds may be used in comparison with the category metrics. In FIG. 13 a content profile 1305 includes a first category metric and a second category metric. The first category metric is compared against the first category threshold 1370. Represented at 1310, the gateway device may determine that the first category metric is within the first category threshold 1370 for an audience that includes an audience trait at 1340. However, the second category metric is above the second category threshold 1380, as shown at 1320. The gateway device may be configured to enforce a content restriction if any of the category metrics for the content are above corresponding category thresholds.

In FIG. 13, a third category threshold 1390 is shown. Based on the configuration of the threshold, an administrator has indicated that the third category threshold 1390 does not apply to an audience having an audience trait above 1350. However, for an audience having an audience trait below 1350, the third category threshold 1390 may apply. It is noted that the content profile 1305 does not include a third category metric associated with the third category threshold 1390. Depending on a configuration of the gateway device 130, the gateway device 130 may ignore the third category threshold 1390 when the third category metric is not available, or the gateway device 130 may restrict access to the content due to the missing third category metric.

Figure 14:
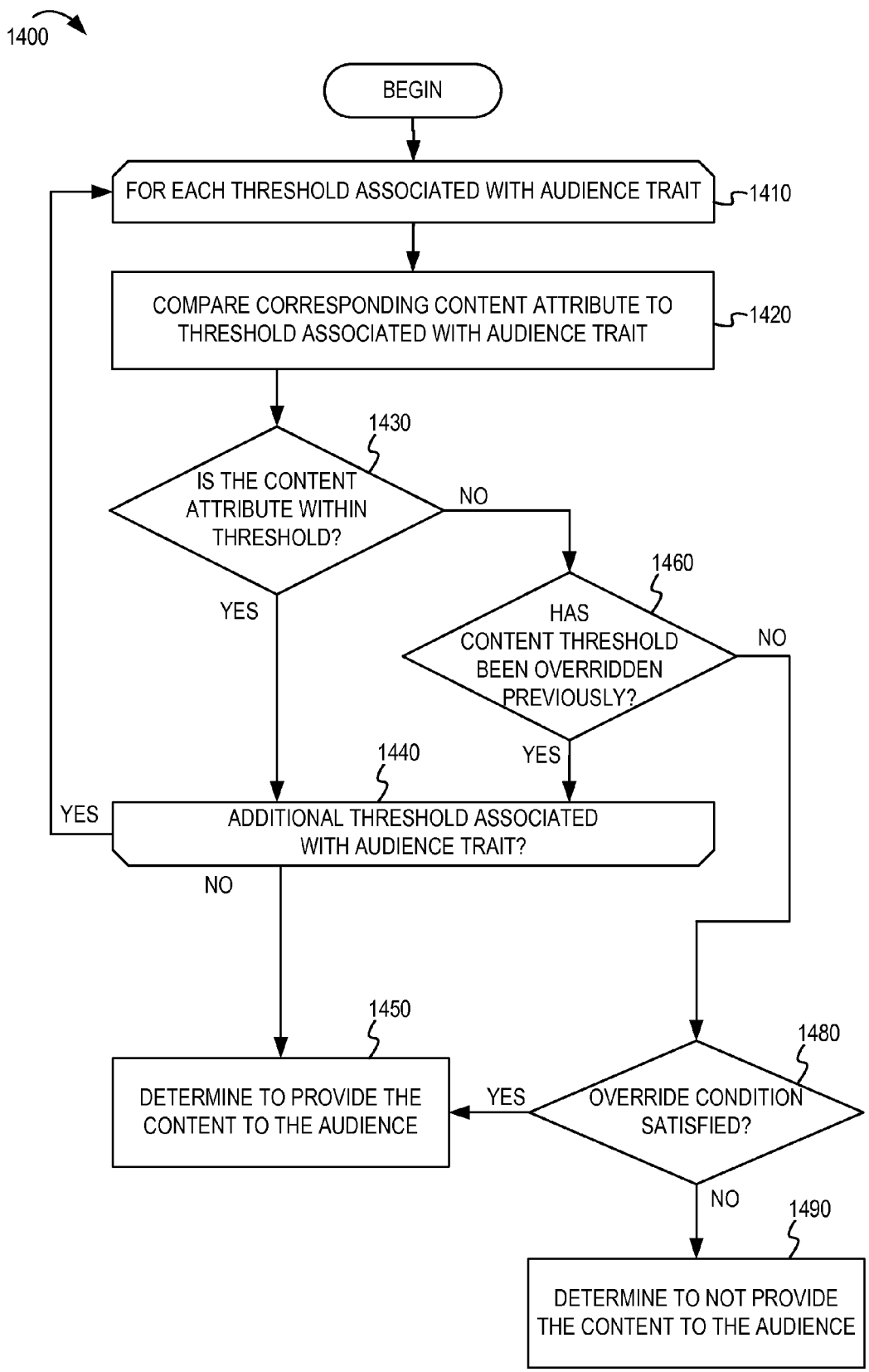
FIG. 14 depicts a flow diagram for a gateway device to determine whether to provide the content to an audience, in accordance with an embodiment of this disclosure.

FIG. 14 depicts a flow diagram for a gateway device to determine whether to provide content to an audience in accordance with an embodiment of this disclosure. The flow diagram 1400 illustrates how the threshold(s) and override conditions may be used by the gateway device. The operations in FIG. 14 are performed in relation to an audience trait, which may be determined beforehand using, for example, the operations of FIG. 5.

Beginning at 1410, the gateway device may perform a set of operations for each threshold associated with audience trait. By performing the operations for each threshold, multiple thresholds and policies may be enforced. For each threshold, the operations include, at 1420, comparing a corresponding content attribute to the threshold. At 1430, if the content attribute is within the threshold, the flow diagram 1400 continues to 1440. Otherwise, if the content attribute is not within the threshold, the flow diagram 1400 continues to 1460. At 1440, if there is an additional threshold associated with the audience trait, the flow diagram 1400 returns to 1410 to check the next threshold. If all thresholds have been checked, and the corresponding content attribute is within each threshold, then at 1440, the flow diagram 1400 continues to 1450. At 1450, the gateway device determines to provide the content to the audience.

At 1460, the gateway device may determine if the content threshold has been overridden previously. For example, an administrator may have previously overridden the threshold with regard to a particular content item. If the content threshold has been overridden previously, the flow diagram 1400 continues to 1440 so that additional thresholds, if any, can be checked. Otherwise, at 1460, if the content threshold has not been previously overridden, the flow diagram 1400 continues to 1480.

At 1480, the gateway device may determine if an override condition is satisfied. Override conditions may be similar to those described with regard to FIG. 9. Examples include an express authorization from an administrator device or an implicit authorization based on the presence of a specific person in the audience. If an override condition is satisfied, the flow diagram 1400 continues to 1450 where the gateway device determines to provide the content to the audience. If, at 1480, the override condition is not satisfied, the flow diagram 1400 continues to 1490, where the gateway device determines to not provide the content to the audience. In other words, the gateway device will restrict access to the content when the content attribute is not within the threshold and no override condition is satisfied.

Figure 15:
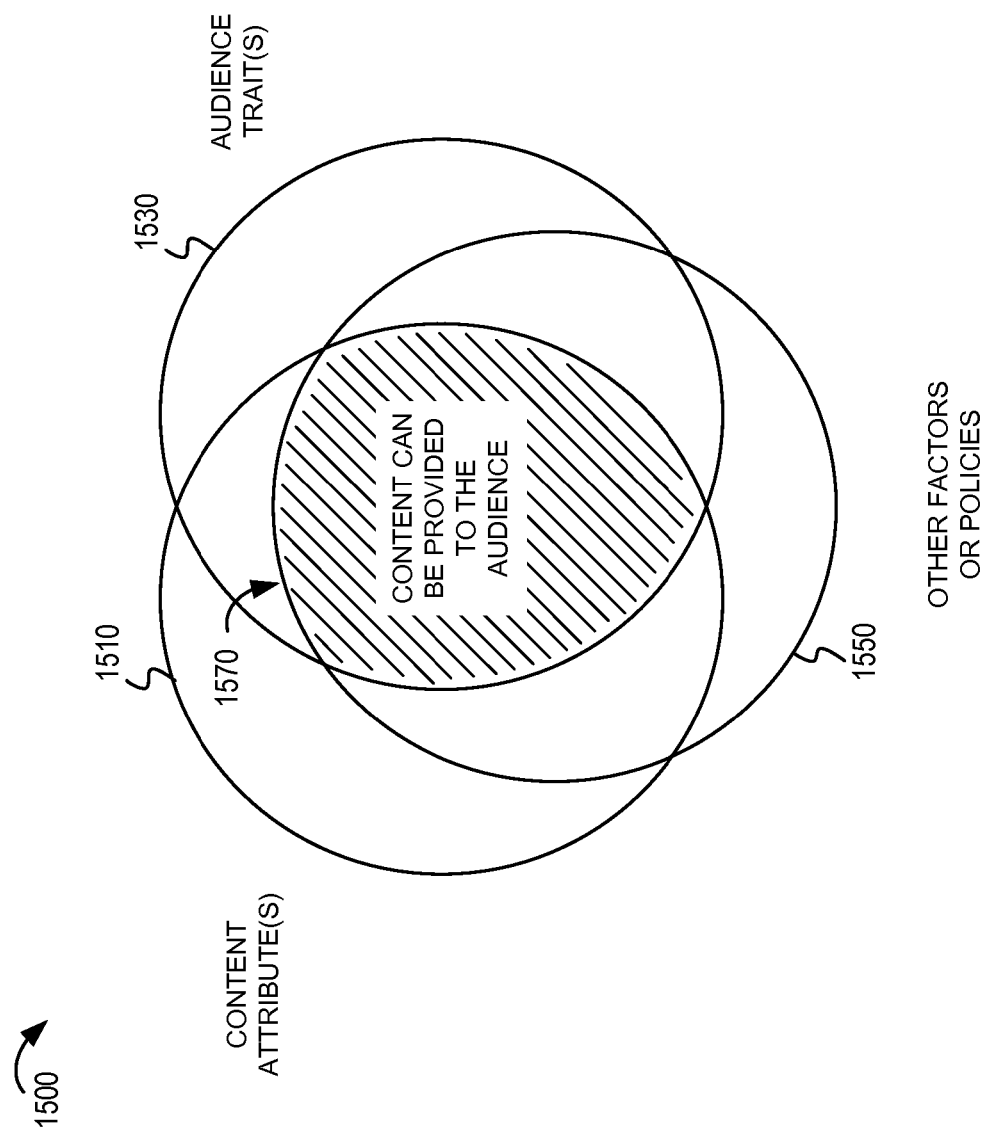
FIG. 15 depicts a conceptual illustration in which content attributes, audience traits, and other factors or policies are represented in a Venn diagram for determining whether to provide content to an audience, in accordance with an embodiment of this disclosure.

FIG. 15 depicts a conceptual illustration for determining whether to provide the content to the audience in accordance with an embodiment of this disclosure. Content attributes 1510, audience traits 1530, and other factors or policies 1550 are represented in a Venn diagram 1500. The intersection of the content attributes 1510 and audience traits 1530 may be similar to the thresholds described previously. The policies 1550 may refer to other policies enforced by the gateway device. For example, the gateway device may limit the amount of time that a person can view content. A time of day restriction may also be used to limit access to content for a person. The location of a media output device may also be a factor. For example, if a request for content is associated with a media output device located in a child's room, the gateway device may enforce different thresholds or time/duration restrictions. Because the gateway device has biometric data to identify persons or traits, the other factors or policies may be customized when particular individuals are near the media output device requesting content. The gateway device may determine to provide the content based on an intersection 1570 of the content attributes 1510, audience traits 1530 and policies 1550.

Figure 16:
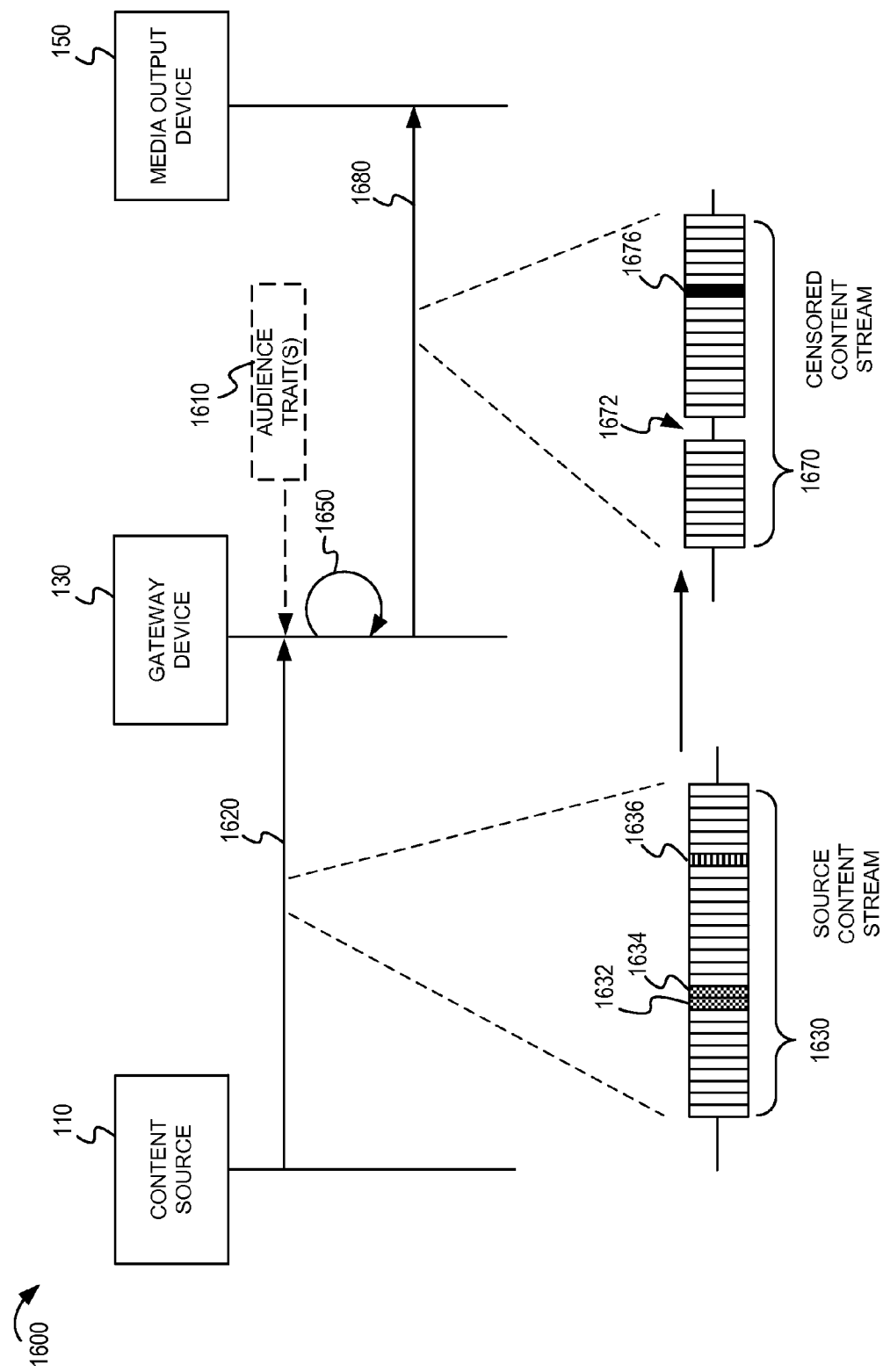
FIG. 16 depicts a flow diagram in which a content stream is partially censored at a gateway device based on an audience trait, in accordance with an embodiment of this disclosure.

FIG. 16 depicts a flow diagram 1600 in which a source content stream 1630 is partially censored at a gateway device 130 based on an audience trait 1610 in accordance with an embodiment of this disclosure. At 1620, the gateway device 130 may receive the content from the content source 110. Based on the audience trait 1610, the gateway device 130 may partially censor the content at 1650. The censored content is sent to the media output device 150 at 1680.

FIG. 16 illustrates the censorship conceptually, showing the source content stream 1630 that was originally received. The source content stream 1630 may comprise a plurality of packets or segments of content. Alternatively, the gateway device 130 may decode and reconstruct the content and analyze the content using a division of segment (such as time periods). In FIG. 16, the source content stream 1630 is represented as a series of segments of content. At segments 1632 and 1634 the content may include content attributes that are not allowed (e.g., access is not granted) to be sent to the media output device 150. For example, a family movie rated "G" might be broken up by commercials at 1632 and 1634 that the parent would deem inappropriate for the audience of the media output device 150. At segment 1636, the content might be objectionable in a different way than in segments 1632 and 1634. For example, segment 1636 may include brief portion of inappropriate language (such as profanity) of a movie. As shown in FIG. 1600 there may be separate reasons that segments 1632, 1634 and 1676 are not allowed for the audience. The gateway device 130 may alter the content in different ways to remedy the issues with segments 1632, 1634 and 1676. For example, the gateway device 130 may simply omit part of the content. In the censored content stream 1670, the space at 1672 illustrates that the segments 1632, 1634 are removed from the censored content stream 1670. In another form of censorship, the gateway device 130 may alter, obscure, or substitute a portion of segment 1636. In the censored content stream 1670, the corresponding segment 1676 may be an altered form of segment 1636. Using the example of profanity, the gateway device 130 may replace an expletive with a substitute word. Alternatively, the segment 1676 may be based on segment 1637 with the audio portion muted or replaced.

Figure 17:
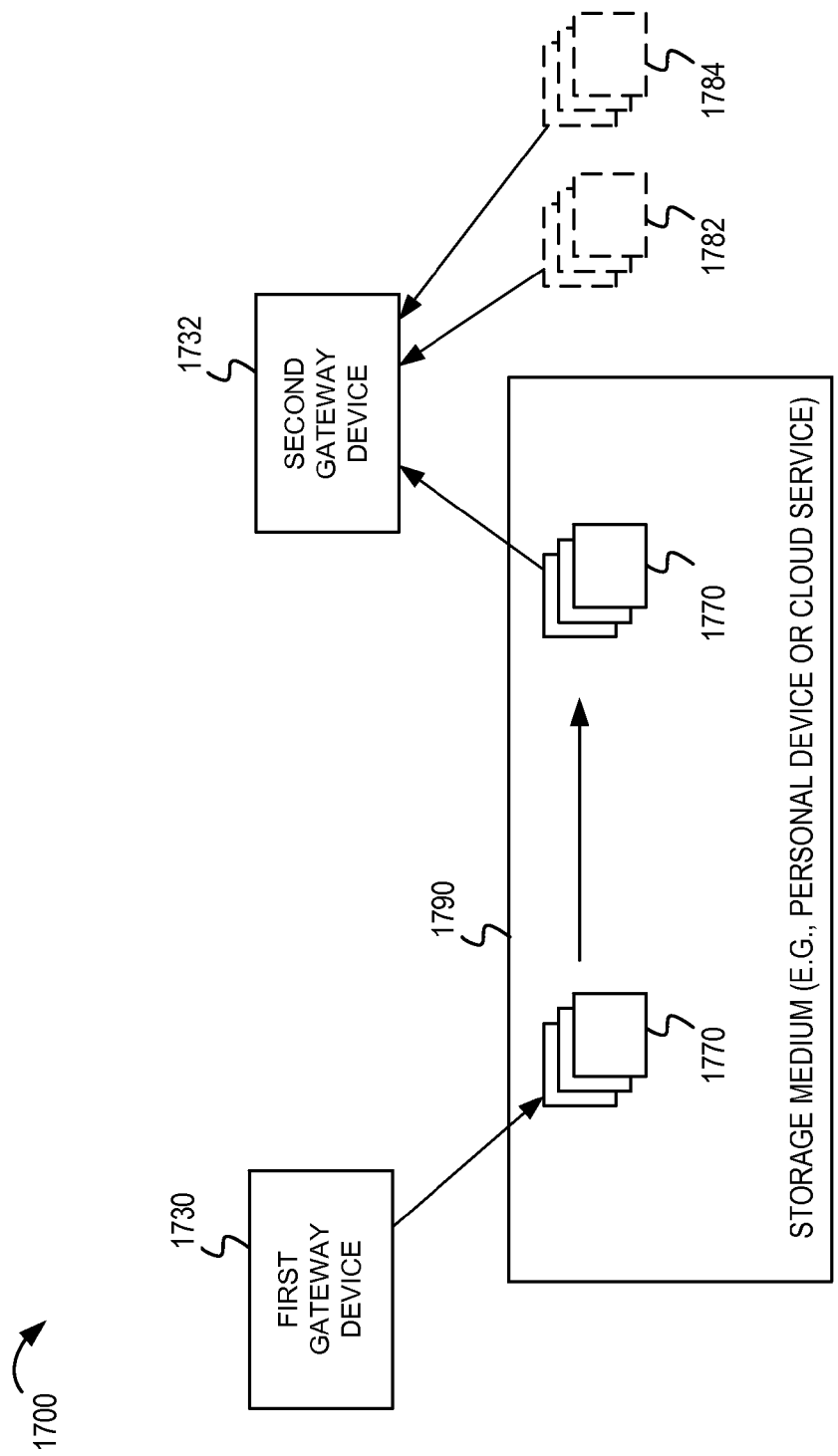
FIG. 17 depicts configuration information being copied or moved to a second gateway device, in accordance with an embodiment of this disclosure.

FIG. 17 depicts an example system 1700 in which configuration information 1770 is copied or exported from a first gateway device 1730 to storage medium 1790. The storage medium 1790 may be associated with a personal device or other apparatus having memory. Alternatively, the storage medium 1790 may be located at a network-based server (sometimes referred to as a cloud service). The configuration information 1770 can be uploaded or moved to a second gateway device 1732. For example, the second gateway device 1732 may be a new replacement unit that will replace an existing first gateway device 1730. Alternatively, the second gateway device 1732 may be at a hotel or vacation property. A parent may copy the configuration information 1770 from the first gateway device 1730 so that the same settings, thresholds, predictive history, etc. can be used at a second location having the second gateway device 1732.

In one scenario, the second gateway device 1732 may be a vacation property with multiple families. Each family may bring their configuration information (shown as configuration information 1770 and other configuration information 1782, 1784) for use in the vacation property. The second gateway device 1732 can use a combination of the configuration information to determine whether content should be provided for an audience. For example, the second gateway device 1732 may analyze the content attribute and threshold under each set of configuration information. If access to the content is granted according to all sets of configuration information, the second gateway device 1732 may determine to grant access to the content. However, if one of the sets of configuration information would result in a determination that access to the content is not restricted for the audience, then the gateway device may restrict access to the content. In this example, the most restrictive policy would govern whether to grant or restrict access to the content.

FIGS. 1-17 and the operations described herein are examples meant to aid in understanding various embodiments and should not be used to limit the scope of the claims. Embodiments may perform additional operations, fewer operations, operations in parallel or in a different order, and some operations differently. While this disclosure enumerates several embodiments, additional embodiments are considered within the scope of this disclosure.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "unit" or "system." Furthermore, aspects of the present disclosure may take the form of a computer program product embodied in one or more computer readable medium(s) having computer readable program code embodied thereon.

Any combination of one or more computer readable medium(s) may be utilized, with the sole exception being a transitory, propagating signal. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagrams and/or block diagrams of methods, apparatus (systems) and computer program products according to embodiments of the present disclosure. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagrams and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 18:
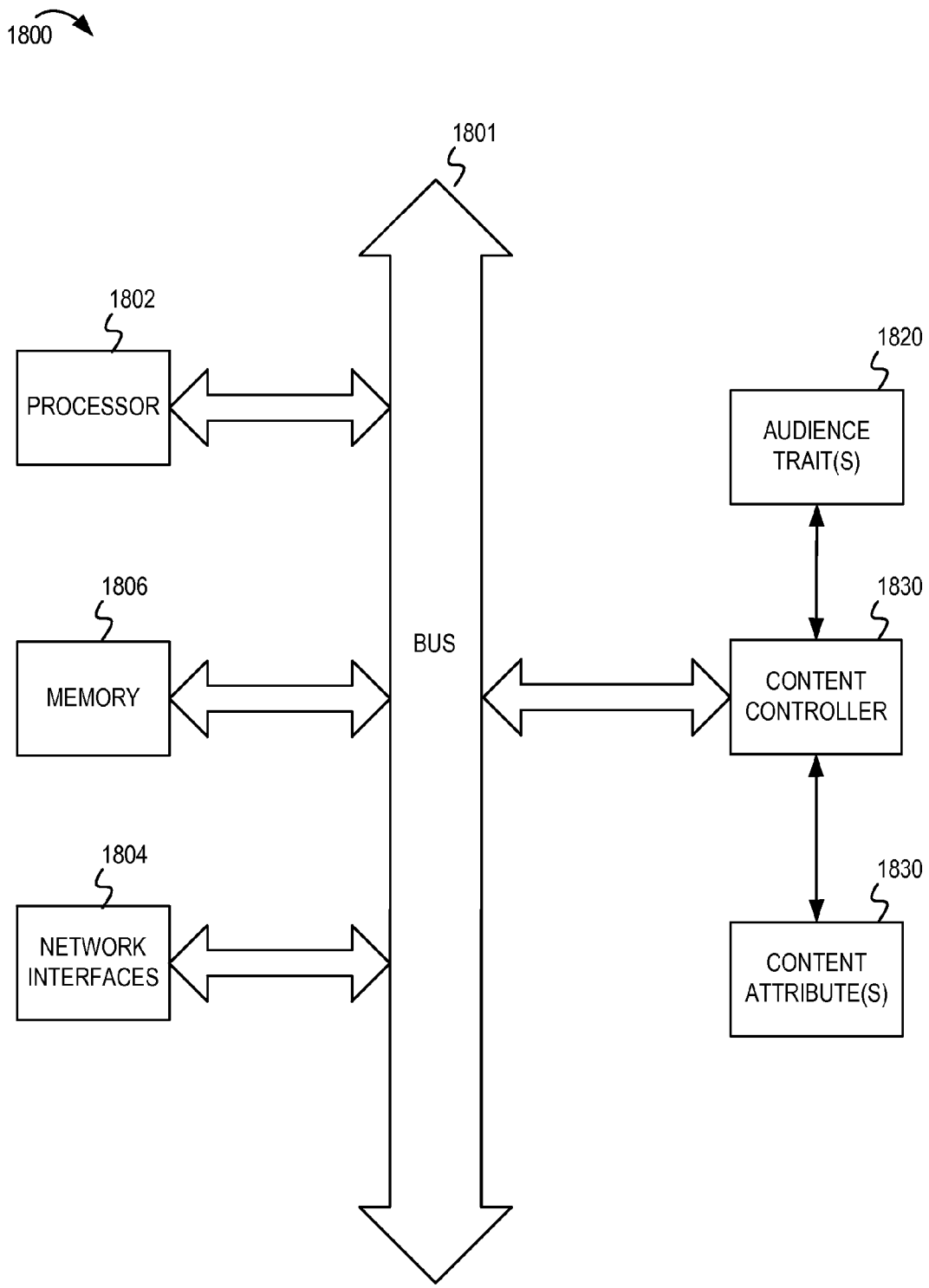
FIG. 18 is an example block diagram illustrating a gateway device capable of implementing various embodiments of this disclosure.

FIG. 18 is an example block diagram of one embodiment of an electronic device 1800 capable of implementing various embodiments of this disclosure. In some implementations, the electronic device 1800 may be gateway device, such as gateway device 130. The electronic device 1800 includes a processor 1802 (possibly including multiple processors, multiple cores, multiple nodes, and/or implementing multi-threading, etc.). The electronic device 1800 includes a memory 1806. The memory 1806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1800 also includes a bus 1801 (e.g., PCI, ISA, PCI-Express, HyperTransport®, InfiniBand®, NuBus, AHB, AXI, etc.). The electronic one or more network interfaces that may be a wireless network interface (e.g., a WLAN interface, a Bluetooth® interface, a WiMAX interface, a ZigBee® interface, a Wireless USB interface, etc.) or a wired network interface (e.g., a powerline communication interface, an Ethernet interface, etc.). In some implementations, electronic device 1800 may support multiple network interfaces 1804—each of which may be configured to couple the electronic device 1800 to a different communication network.

The memory 1806 may store instructions to implement embodiments described above. The memory 1806 may include one or more functionalities determine a content attribute and/or an audience trait. The electronic device 1800 may also include a content controller 1830 to determine whether to provide a content item based on audience trait(s) 1820 and content attribute(s) 1830. Any one of these functionalities may be partially (or entirely) implemented in hardware and/or on the processor 1802. For example, the functionality may be implemented with an application specific integrated circuit, in logic implemented in the processor 1802, in a co-processor on a trait capture device or card, etc. Further, realizations may include fewer or additional components not illustrated in FIG. 18 (e.g., video cards, audio cards, additional network interfaces, trait capture devices, etc.). The processor 1802, and the memory 1806, may be coupled to the bus 1801. Although illustrated as being coupled to the bus 1801, the memory 1806 may be directly coupled to the processor 1802.

While the embodiments are described with reference to various implementations and exploitations, it will be understood that these embodiments are illustrative and that the scope of the present subject matter is not limited to them. In general, techniques for controlling access to content as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present subject matter.

What is claimed is:

1. A method performed by a gateway device, the method comprising:

detecting, by the gateway device, a request for content to be delivered to a media output device via the gateway device, wherein the gateway device facilitates network communication between the media output device and a content source;

determining an audience trait associated with an audience of the media output device based, at least in part, on biometric data associated with at least one person in the audience;

determining a content attribute associated with the content;

determining that the content attribute is not within a threshold associated with the audience trait;

determining whether an override condition is present, wherein the override condition comprises at least one member of the group consisting of
an authorization, from an administrator, for the audience to access the content, and
a determination that an authorized person is present in the audience based, at least in part, on the biometric data;
preventing, by the gateway device, the content from being provided to the media output device in response to determining that the content attribute is not within the threshold and that the override condition is not present; and
providing, via the gateway device, the content from the content source to the media output device in response to determining that the override condition is present.

2. The method of claim 1, wherein the audience trait describes at least one member of a group consisting of an identity, an estimated age, a psychological trait, an emotional state, and a membership in a predefined class of persons.

3. The method of claim 1, wherein the audience trait comprises an estimated age of a youngest person in the audience, and wherein the content attribute is an age-based content rating.

4. The method of claim 1, wherein determining the content attribute associated with the content comprises:
retrieving the content from the content source;
buffering the content at the gateway device; and
analyzing the buffered content to determine the content attribute.

5. The method of claim 1, wherein determining the content attribute associated with the content comprises determining the content attribute from metadata associated with the content, wherein the metadata comprises at least one member of a group consisting of ratings information, a content description, a review article, a transcript, lyrics, closed captioning, and embedded metadata included in the content.

6. The method of claim 5, further comprising retrieving the metadata from a metadata source that is different from the content source associated with the content.

7. The method of claim 1, wherein determining that the content attribute is not within the threshold associated with the audience trait comprises:
determining corresponding metrics for each of a plurality of metadata categories;
comparing the corresponding metrics for each of the plurality of metadata categories to a plurality of corresponding thresholds for each of the plurality of metadata categories; and
determining that the content attribute is not within the threshold when at least one of the corresponding metrics is not within one of the plurality of corresponding thresholds.

8. The method of claim 1, wherein the biometric data is obtained from one or more trait capture devices in proximity of the media output device.

9. The method of claim 8, wherein determining the audience trait comprises:
obtaining the biometric data associated with the at least one person;
performing pattern recognition on the biometric data; and
determining the audience trait based, at least in part, on the pattern recognition.

10. The method of claim 9, wherein the pattern recognition comprises at least one member of a group consisting of age recognition, facial recognition, voice recognition, and body recognition.

11. The method of claim 9, further comprising:
determining whether the at least one person is positively identified based, at least in part, on the pattern recognition; and
determining the audience trait based, at least in part, on a profile about the at least one person when the at least one person is positively identified.

12. The method of claim 9, wherein the audience comprises a plurality of persons, and wherein determining the audience trait comprises:
for each person of the plurality of persons:
obtaining the biometric data associated with the person,
performing pattern recognition on the biometric data, and
determining a person trait based on the pattern recognition; and
determining the audience trait based on a lowest common characteristic of the person traits for all of the plurality of persons in the audience.

13. The method of claim 1, wherein determining that the content attribute is not within the threshold associated with the audience trait comprises:
determining the threshold associated with the audience trait based, at least in part, on configuration information at the gateway device; and
comparing the content attribute to the threshold associated with the audience trait.

14. The method of claim 1, wherein determining that the content attribute is not within the threshold associated with the audience trait comprises:
comparing a plurality of content attributes to a plurality of corresponding thresholds associated with the audience trait; and
determining that the content attribute is not within the threshold when all of the plurality of content attributes are within the plurality of corresponding thresholds associated with the audience trait.

15. The method of claim 1, wherein determining whether the override condition is present comprises:
sending, to the administrator, a request for the authorization for the audience to access the content; and
receiving the authorization from the administrator.

16. A gateway device, comprising:
a plurality of network interfaces, including at least a first interface capable of being coupled to a first network having a media output device, and at least a second interface capable of being coupled to a second network for accessing content from a content source;
a processor; and
memory for storing instructions therein, which when executed by the processor, cause the gateway device to:
detect, by the gateway device, a request for the content to be delivered to the media output device via the gateway device;
determine an audience trait associated with an audience of the media output device, wherein the audience trait is determined based, at least in part, on biometric data associated with at least one person in the audience;
determine a content attribute associated with the content;
determine that the content attribute is not within a threshold associated with the audience trait;

determine whether an override condition is present, wherein the override condition comprises at least one member of the group consisting of
  a previous authorization, from an administrator, for the audience to access the content, and
  a determination that an authorized person is present in the audience based, at least in part, on the biometric data;
prevent, by the gateway device, the content from being provided to the media output device in response to determining that the content attribute is not within the threshold and that the override condition is not present; and
provide, via the gateway device, the content from the content source to the media output device in response to determining that the override condition is present.

17. The gateway device of claim 16, wherein the instructions, when executed by the processor, cause the gateway device to obtain the biometric data from one or more trait capture devices in proximity of the media output device.

18. The gateway device of claim 16, wherein the instructions, when executed by the processor, cause the gateway device to:
  obtain the biometric data associated with the at least one person;
  perform pattern recognition on the biometric data; and
  determine the audience trait based, at least in part, on the pattern recognition.

19. The gateway device of claim 16, wherein the instructions to determine the content attribute comprise instructions that cause the gateway device to:
  retrieve the content from the content source;
  buffer the content at the gateway device; and
  analyze the buffered content to determine the content attribute.

20. The method of claim 1, wherein the gateway device comprises a plurality of network interfaces, including at least a first interface capable of being coupled to a first network having the media output device, and at least a second interface capable of being coupled to a second network for accessing the content from the content source.

21. A non-transitory computer readable medium having instructions stored therein which, when executed by a processor of a gateway device, cause the gateway device to:
  detect, by the gateway device, a request for the content to be delivered to the media output device via the gateway device, wherein the gateway device facilitates network communication between the media output device and a content source;
  determine an audience trait associated with an audience of the media output device, wherein the audience trait is determined based, at least in part, on biometric data associated with at least one person in the audience;
  determine a content attribute associated with the content;
  determine that the content attribute is not within a threshold associated with the audience trait;
  determine whether an override condition is present, wherein the override condition comprises at least one member of the group consisting of
    a previous authorization, from an administrator, for the audience to access the content, and
    a determination that an authorized person is present in the audience based, at least in part, on the biometric data;
  prevent, by the gateway device, the content from being provided to the media output device in response to determining that the content attribute is not within the threshold and that the override condition is not present; and
  provide, via the gateway device, the content from the content source to the media output device in response to determining that the override condition is present.

22. The non-transitory computer readable medium of claim 21, wherein the instructions, when executed by the processor, cause the gateway device to obtain the biometric data from one or more trait capture devices in proximity of the media output device.

23. The non-transitory computer readable medium of claim 21, wherein the instructions, when executed by the processor, cause the gateway device to:
  obtain the biometric data associated with the at least one person;
  perform pattern recognition on the biometric data; and
  determine the audience trait based, at least in part, on the pattern recognition.

24. The non-transitory computer readable medium of claim 21, wherein the instructions to determine the content attribute comprise instructions that, when executed by the processor, cause the gateway device to:
  retrieve the content from the content source;
  buffer the content at the gateway device; and
  analyze the buffered content to determine the content attribute.

* * * * *